(12) United States Patent
Mountford et al.

(10) Patent No.: US 6,880,575 B2
(45) Date of Patent: Apr. 19, 2005

(54) WATER MIXING VALVE

(75) Inventors: Colin Lander Mountford, Stafford; Paul John Newcombe, Surrey; Kelvin Paul Towler, Kent; James George Elcoaté Smith, Gloucester; Daniel James Flicos, Essex, all of (GB)

(73) Assignee: Aqualisa Products Ltd. (GB)

( * ) Notice: Subject to any disclaimer, the term of this patent is extended or adjusted under 35 U.S.C. 154(b) by 647 days.

(21) Appl. No.: 09/794,796

(22) Filed: Feb. 27, 2001

(65) Prior Publication Data

US 2001/0020645 A1 Sep. 13, 2001

(30) Foreign Application Priority Data

Feb. 28, 2000 (GB) .............................................. 0004674

(51) Int. Cl.$^7$ ................................................. E03C 1/01
(52) U.S. Cl. ................................................. 137/625.41
(58) Field of Search ........................ 137/625.41; 4/676, 4/677

(56) References Cited

U.S. PATENT DOCUMENTS

| | | | |
|---|---|---|---|
| 3,762,638 A | * 10/1973 | Goldsmith | .................. 236/12.2 |
| 3,913,612 A | 10/1975 | Tolnai | |
| 3,918,678 A | 11/1975 | Rechtsteiner et al. | |
| 3,921,659 A | 11/1975 | Rudewick, III | |
| 4,611,757 A | * 9/1986 | Saether | .................. 137/625.41 |

(Continued)

FOREIGN PATENT DOCUMENTS

| | | |
|---|---|---|
| DE | 30 48 399 A1 | 7/1982 |
| EP | 0 699 856 A1 | 8/1995 |

(Continued)

*Primary Examiner*—William E. Tapolcai
(74) *Attorney, Agent, or Firm*—Harness, Dickey & Pierce, P.L.C.

(57) ABSTRACT

A water mixing valve having two water inlets, a mixing chamber, a rotatable control member having openings for controlling flow from the water inlets to the mixing chamber, the control member comprising a substantially circular plate having first and second surfaces, the water inlets sealing against the first surface and the openings extending between the first and second surfaces and a support for supporting the control member on the second surface, the support including a base wall generally parallel to the control member and a peripheral wall extending from the periphery of the base wall to the periphery of the control member so as to support the control member and form the mixing chamber therebetween wherein the support and control member are together rotatable relative to the water inlets, the support including surfaces against the openings in the control member for directing flows from the respective openings towards one another and into the mixing chamber for efficient mixing, the base wall including inner and outer surfaces, the inner surface facing the second surface of the control member and the water mixing valve further includes a thrust race supporting the support at an outer periphery of the outer surface of the base wall, the water mixing valve further including a water outlet from its housing and a temperature sensor adjacent the outlet to enable electronic control of the output temperature, wherein the walls of the outlet are shaped around the temperature sensor such that of six possible perpendicular orientations of the water mixing valve, in at least three mutually perpendicular orientations and any orientation in between, the temperature sensor remains submerged in water when water is allowed to drain from the water outlet by gravity and the water mixing valve further including a zero position detector, a zero position indicator being provided on the control assembly for detection by the zero position detector such that, when the zero position detector detects the zero position indicator at a predetermined position, it is determined that the openings are at a preselected position relative to the inlets.

19 Claims, 26 Drawing Sheets

U.S. PATENT DOCUMENTS

| | | | |
|---|---|---|---|
| 4,621,659 A | | 11/1986 | Pawelzik |
| 4,827,980 A | | 5/1989 | Mazzei et al. |
| 5,080,128 A | | 1/1992 | Taylor |
| 5,467,799 A | * | 11/1995 | Buccicone et al. ..... 137/625.41 |
| 5,505,225 A | * | 4/1996 | Niakan ................... 137/315.05 |
| 5,685,339 A | | 11/1997 | Lee |
| 5,931,374 A | * | 8/1999 | Knapp .................... 137/625.41 |
| 6,131,611 A | * | 10/2000 | Knapp .................... 134/614.17 |
| 6,135,152 A | * | 10/2000 | Knapp .................... 137/625.41 |

FOREIGN PATENT DOCUMENTS

| | | |
|---|---|---|
| EP | 0 899 074 A2 | 3/1999 |
| FR | 2 302 469 | 9/1976 |
| GB | 604515 | 7/1948 |
| GB | 634662 | 3/1950 |
| GB | 1 327 877 | 8/1973 |
| GB | 1 388 294 | 3/1975 |
| GB | 2 047 552 A | 12/1980 |
| GB | 2 143 929 A | 2/1985 |
| GB | 2 211 585 A | 7/1989 |
| GB | 2 259 130 A | 3/1993 |
| GB | 2 263 755 A | 8/1993 |
| WO | WO 91/06795 | 5/1991 |

* cited by examiner

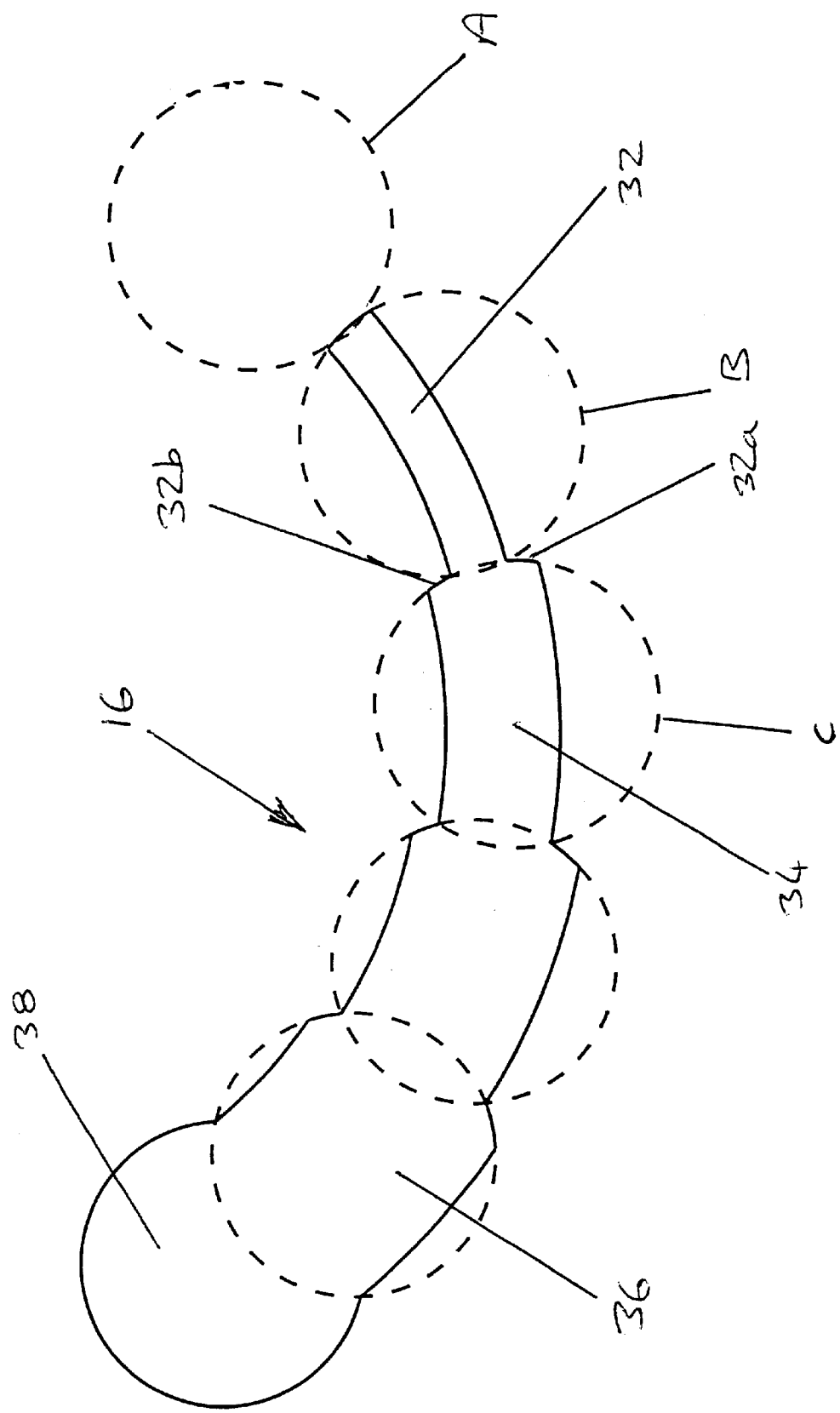

FIG 8(a)
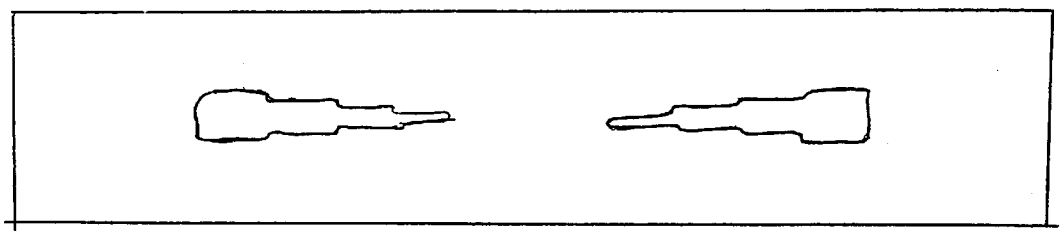
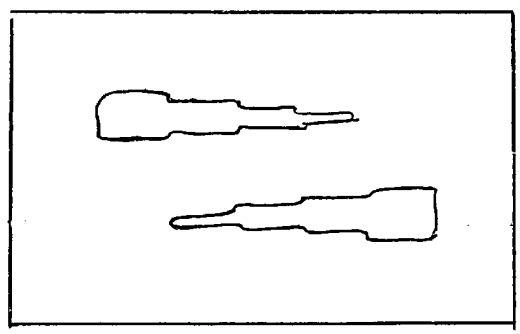
FIG 8(b)
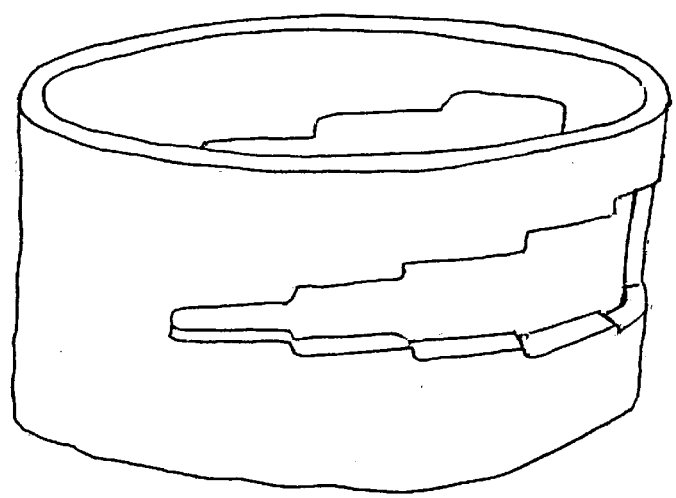
FIG 9

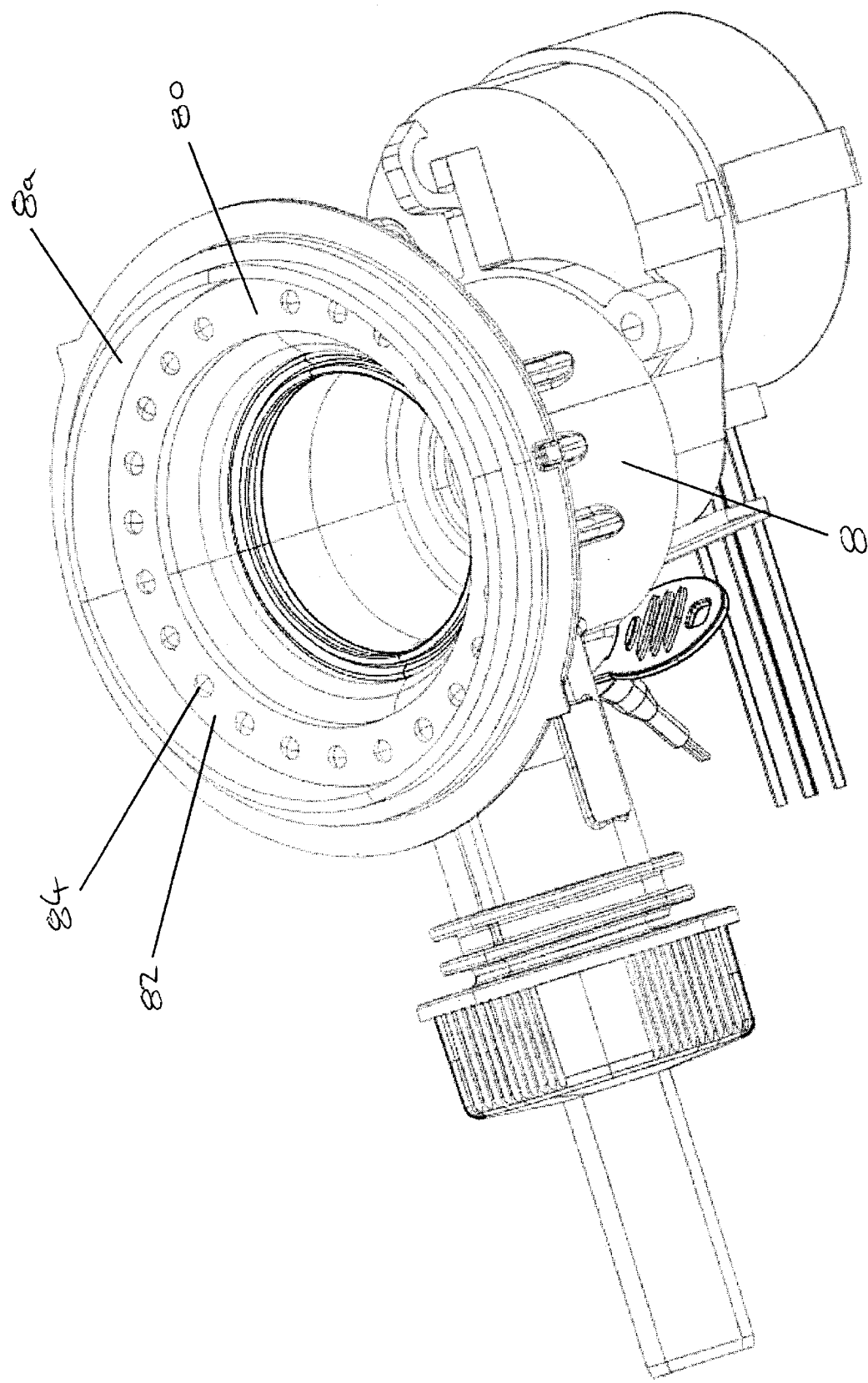

WATER MIXING VALVE

BACKGROUND OF THE INVENTION

1. Field of the Invention

The present invention relates to a water mixing valve and, more particularly, to a water mixing valve having two water inlets, for instance for receiving respectively hot and cold water, and a mixing chamber for mixing flows from the two water inlets.

2. Description of the Related Art

Previously, a large number of different designs of water mixing valves have been provided, for instance for use in shower installations.

It has been proposed to blend or control two water inlets using a disk shaped rotatable control member, the control member having tapered openings adjacent the water inlets. As the disk is rotated, the tapers move over the water inlets so that the open area through the disk presented to each water inlet increases or decreases according to movement of the taper. By providing the narrowest sections of the tapers end to end and the widest sections of the tapers end to end, rotation of the disk causes flow from one inlet to increase whilst flow from the other inlet decreases. This can be used to mix hot and cold water.

OBJECTS OF THE INVENTION

When using a disk shaped or circular plate as the control member, there is a problem in achieving good mixing of the inlet water.

When using a disk shaped or circular plate as the control member, there is a problem in correctly supporting it to allow easy rotation whilst maintaining a good seal between the water inlets and the control member.

Where the rotatable control member is freely rotatable continuously in one direction, it is difficult to ensure that it is correctly positioned. This is particularly important when the valve is used for controlling hot and cold water in a shower. In particular, it is very important that the shower can easily and effectively be returned to the off position and, when turned on, advanced first into the cold water supply.

Where the water mixing valve includes a temperature sensor, there is a problem that, when the valve is turned off and water drains from the valve, scale may build up on the sensor.

Unfortunately, use of tapers does not provide a linear change in water flow. For instance, incremental movements as an inlet first moves over an opening cause large changes in flow due to the back pressure and proportionally large increases in available cross-sectional area for flow.

Although a disk shaped control member functions effectively, the present application also considers how control members might be used to improve mixing of water from the inlets.

In order to seal the water inlets to the control member, it has been proposed to use cup seals which are biassed towards the surface of the control member. However, there is a problem in providing a cup seal with an appropriate sealing force for a wide range of inlet pressures. Furthermore, there is a problem that the cup seal has to seal well with the control member, but not produce undue frictional drag on rotation of the control member.

Because the water inlets must seal with and yet move relative to the control member, there is a problem of frictional drag on the control member.

When constructing the valve in a housing, there is a problem in joining two halves of the housing together with an effective seal and without undue expense. It has been proposed to thread the two halves together, but this can damage the internal seal and makes it difficult to achieve a predetermined orientation between the two halves. Also, clamping the two halves together can result in over compression of the seal and requires a continuous clamping force to resist any internal pressure.

SUMMARY OF THE INVENTION

According to the present invention, there is provided a water mixing valve having:

two water inlets;

a mixing chamber;

a rotatable control member having openings for controlling flow from the water inlets to the mixing chamber, the control member comprising a substantially circular plate having first and second surfaces, the water inlets sealing against the first surface and the openings extending between the first and second surfaces; and a support for supporting the control member on the second surface, the support including surfaces adjacent the openings in the control member for directing flows from the respective openings towards one another and into the mixing chamber for efficient mixing.

In this way, water flow from the water inlets is redirected by the support of the control member so as to improve mixing within the mixing chamber.

Preferably, the support is attached to the outer periphery of the control member so as to form the mixing chamber adjacent the second surface.

In this way, the support surrounds the water flowing through the openings and can be used to redirect that flow.

The support may include a base wall generally parallel to the control member and a peripheral wall joining the periphery of the base wall to the periphery of the control member. Thus, although the base wall may take various shapes and sizes, with a circular base wall corresponding to the control member, a cylindrical mixing chamber is formed.

The support may include an annular wall extending from the base wall to the second surface of the control member so as to define an outer peripheral channel between the annular wall and the peripheral wall and a central mixing cavity within the annular wall wherein the openings are positioned in the control member outwardly of the annular wall and windows are provided in the annular wall to allow flow of water from the outer peripheral channel to the central mixing cavity.

Thus, flow from the openings in the control member is first redirected to follow a peripheral or circumferential path in the outer peripheral channel outside the annular wall. This flow is then again redirected radially through the windows into the central mixing cavity.

Preferably, the support includes a pair of generally extending and diametrically opposed walls dividing the outer peripheral channel into a pair of channels, each channel being opposite a respective one of said openings.

Thus, any flow through one of the openings passes into its respective channel before passing into the central mixing cavity through one or more windows. In this way, radial flow originating from a particular opening can be positioned as required with respect to radial flow from the other opening so as to achieve good mixing.

Preferably, the opposed walls are positioned generally symmetrically with respect to the openings.

Four windows may be provided in the annular wall, one at each end of each of the channels.

In this way, flow originating from one opening enters the central mixing cavity radially alongside flow from the other opening. Furthermore, for the flow originating from each opening, two approximately radially opposed flows occur in the mixing cavity. As a result of this, mixing within the central mixing cavity is highly effective.

Of course, other numbers of windows might also be used. Indeed, each window could comprise a plurality of openings forming sub-windows.

Preferably, the water mixing valve includes a hollow shaft by which the support may be rotated, the shaft extending axially from the base wall and the base wall defining a central aperture within the annular wall such that water may flow from the central mixing cavity into the shaft.

Thus, the walls forming the outer periphery of the hollow shaft join with the base wall around the central aperture such that the central mixing cavity joins with the open space within the hollow shaft through the central aperture.

Preferably, proximate the central mixing cavity, the interior of the shaft is provided with inwardly facing vanes so as to cause a spiral flow of water within the shaft.

The vanes may be an integral part of the hollow shaft or provided as an insert. Irrespective, the spiral flow helps to further enhance the mixing.

Preferably, the vanes extend axially along the shaft and, over the extent of the vanes, the internal cross-section of the shaft is progressively reduced in the direction of flow and, at the end of the vanes, enlarged so as to form a Venturi.

Thus, as flow is moved along the hollow shaft, it is twisted by the vanes and progressively constricted by the walls of the hollow shaft (or walls of the insert on which the vanes are formed) so as to accelerate the flow. Furthermore, where the internal cross-section is enlarged once again, further turbulence is caused to assist further mixing.

The vanes may extend into the hollow shaft beyond the enlargement of the cross-section so as to maintain the rotating flow through the Venturi.

Preferably, at the upstream end of the vanes, adjacent the central mixing cavity, each vane is offset from a respective window around the central aperture by an amount such that a vortex of flow from the respective window is centred on the respective vane.

In this way, flow originating from a particular opening and then rotating once it has entered the central mixing cavity is not able merely to continue rotating as it passes down between two adjacent vanes. Instead, the rotating flow is centred on a vane such that as it moves down towards the hollow shaft, it is broken up and mixes with one of the adjacent rotating flows.

According to the present invention, there is also provided a water mixing valve having:

two water inlets;

a mixing chamber;

a rotatable control member having openings for controlling flow from the water inlet to the mixing chamber, the control member comprising a substantially circular plate having first and second surfaces, the water inlets sealing against the first surface and the openings extending between the first and second surfaces;

a support including a base wall generally parallel to the control member and a peripheral wall extending from the periphery of the base wall to the periphery of the control member so as to support the control member and form the mixing chamber therebetween; wherein the support and control member are together rotatable relative to the water inlets;

the base wall includes inner and outer surfaces, the inner surface facing the second surface of the control member; and the water mixing valve further includes:

a thrust race supporting the support at an outer periphery of the outer surface of the base wall.

In this way, the forces on the control member exerted by the water pressure in the water inlets is absorbed directly by the thrust race of the control member. Twisting of the control member and deflection of any connected shaft is thereby avoided.

Preferably, the thrust race includes a plurality of rotatable members distributed for contact around the outer periphery of the outer surface of the base wall.

The thrust race may comprise a moulded member holding the plurality of rotatable members captive.

Preferably, the water mixing valve further includes a hollow shaft by which the support may be rotated, the shaft extending axially from the base wall and the base wall defining a central aperture such that water may flow from the mixing chamber into the shaft.

In this way, flow from the mixing chamber is taken axially from the support from within the thrust race.

Preferably, the water mixing valve further includes a housing for containing the control member, support and hollow shaft, the housing including first walls defining an inlet cavity for receiving the peripheral wall of the support, second walls defining an outlet cavity for receiving the hollow shaft and a lip between the inlet and outlet cavities, wherein the thrust race is located between the base wall and the lip such that the support is rotatably supported on the lip.

In this way, the support and control member are mounted securely with the water pressure forces on the control member being transferred directly through the peripheral wall of the support to the lip of the housing.

Preferably, the second walls define a drive aperture and the hollow shaft extends in the outlet cavity from the lip to and through the drive aperture so as to enable the hollow shaft, support and control member to be rotated.

In this way, manual or motor drive may be provided to the end of the hollow shaft.

Preferably, the second walls define a water outlet and the hollow shaft is provided with a plurality of outlet openings around a periphery opposite said water outlet such that water may flow from within the hollow shaft through the outlet openings into the outlet cavity and then out through the water outlet.

Preferably, the water mixing valve further includes a seal between the hollow shaft and the second walls upstream of said water outlet and said outlet openings so as to prevent water passing directly from the two water inlets between the support and the housing to the water outlet.

In this way, the water reaching the outlet is substantially only that which has passed through the mixing chamber. In other words, water from the inlets is prevented from passing around the outside of the support and control member and passing to the outlet in a relatively unmixed state.

According to the present invention, there is also provided a water mixing valve having:

a housing;

two water inlets to the housing for hot and cold water respectively;

a water outlet from the housing; and a temperature sensor adjacent the outlet to enable electronic control of the output temperature; wherein the walls of the outlet are shaped around the temperature sensor such that of six possible perpendicular orientations of the water mixing valve, in at least three mutually perpendicular orientations and any orientation in between, the temperature sensor remains submerged in water when water is allowed to drain from the water outlet by gravity.

In this way, when the water mixing valve is turned off, the temperature sensor will remain submerged in water so that scale is less likely to build up.

Preferably, the water mixing valve further includes an outlet cavity having walls defining an outlet opening, the water outlet joining the outlet cavity at the periphery of the outlet opening so as to allow flow from the outlet cavity to the water outlet, wherein:

the temperature sensor is positioned in the outlet cavity and, where perpendicular notional first and second planes intersect the periphery of the outlet opening such that the outlet opening does not cross either plane, the temperature sensor is positioned in the outlet cavity on the opposite side of both the first and second planes, a first of said at least three mutually perpendicular orientations being with said first plane horizontal and the temperature sensor below the outlet and the second of said at least three mutually perpendicular orientations being with said second plane horizontal and the temperature sensor below the outlet.

In this way, when the water mixing valve is mounted in use with either of the notional planes horizontal, the temperature sensor will be below the lowest point from which water will drain and, hence, will remain submerged.

Preferably, the water mixing valve further includes a baffle in the outlet wherein, where a third notional plane perpendicular to the first and second planes passes through the effective boundary of the baffle, the temperature sensor is positioned in the outlet cavity to one side of the third plane and on the same side as the baffle, the third of said at least three mutually perpendicular orientations being with said third plane horizontal and the temperature sensor below the third plane.

This provides a third plane such that when the mixing valve is mounted in use with that plane horizontal, the temperature sensor again remains below the lowest point from which water will drain and, hence, remain submerged. In this case, the effective boundary of the baffle, i.e. its lowest point over which water will drain, holds water in the outlet cavity.

Preferably, the baffle extends across more than half of the outlet such that the third plane is offset from the outlet and the temperature sensor is positioned on a plane passing through the centre of the outlet.

In this way, the temperature sensor can be positioned centrally with respect to the outlet, this position generally giving a more representative indication of the overall mixed temperature.

Preferably the baffle comprises a helical or spiral such as an Archimedean screw which, if necessary, is offset.

By providing the baffle as a helical or spiral shape, the overall internal cross-sectional area of the outlet is reduced only by a minimal amount, in particular the thickness of the screw wall.

The Archimedean screw need only turn through 180 so as to provide an effective boundary at the height of the centre of the screw.

Preferably, the periphery of the outlet lies in one of the first and second planes. Thus, in use, the mixing valve is mounted with the outlet either vertical or horizontal.

Preferably, the water mixing valve is provided with means for mounting it to a horizontal or vertical surface such that it lies in the at least three mutually perpendicular orientations.

In order to provide such mounting, the water mixing valve may be provided in a casing.

According to the present invention, there is provided a water mixing valve having two water inlets;
a mixing chamber;
a rotatable control assembly having openings for controlling flow from the water inlets to the mixing chambers; and
a zero position detector; wherein
a zero position indicator is provided on the control assembly for detection by the zero position detector such that, when the zero position detector detects the zero position indicator at a predetermined position, it is determined that the openings are at a preselected rotational position relative to the inlets.

In this way, the relative position of the control member to the water inlets may easily be detected. In particular, the control assembly may be moved until the zero position is detected. At that point, the position of the control assembly is known. Hence, subsequent positions for the control assembly may be determined according to the amount by which it is moved.

Preferably, the control assembly includes a control member having said openings and a shaft extending axially from the control member, the control assembly being rotatable by the shaft and the zero position indicator being provided at a predetermined position around the periphery of the shaft remote from the control member.

In this way, the position of the control member may be detected remotely.

With the position indicator at a predetermined relative rotational orientation with respect to the openings, when the position of the position indicator is detected, the position of the openings can be deduced.

Preferably the zero position indicator extends axially along the shaft such that it can be detected at various positions along the shaft.

In this way, the zero position detector need not be located accurately with respect to the length of the shaft.

Preferably, the water mixing valve further includes housing in which the control member and shaft are supported, the housing defining a drive aperture through which the shaft extends so as to be rotatable from outside the housing wherein the zero position indicator is positioned outside the housing.

In this way, the zero position detector may be easily accessible.

Preferably the housing includes an outer surface around the shaft and the zero position detector is mounted on the outer surface adjacent the shaft.

A plurality of detector mounts may be provided on the outer surface around the shaft, each detector mount being for receiving the zero position detector.

In this way, the zero position detector may be located in one of a plurality of positions around the shaft. This enables the zero position for the control assembly relative to the water inlets to be varied according to the requirements of the user.

Preferably, two detector mounts are provided, one diametrically opposed to the other with regard to the shaft.

This is particularly useful where the openings in the control assembly are symmetric with regard to the two inlets. In particular, the position at which the zero position detector is mounted may be determined according to how the water inlets are connected to the water supplies. Thus, it may be the intention that one water inlet is normally connected to a hot water supply and that a particular detector mount is used for the zero position detector. However, should the water mixing valve be plumbed in with the other water inlet connected to the hot water supply, then the zero position detector may easily be moved to the other detector mount such that the device will operate as normal.

Alternatively, zero position detectors may be provided at more than one of the detector mounts with an associated control system responding only to the appropriate zero position detector.

The zero position indicator may be a cam such as a recess or a protrusion and the zero position detector may comprise a micro switch.

According to the present invention, there is provided a water mixing valve having:

two water inlets;

a mixing chamber; and a control member defining respective tapered openings between the two water inlets and the mixing chamber, the tapered openings being arranged relative to the water inlets such that movement of the control member simultaneously reduces the open area between one of the water inlets and the mixing chamber and increases the open area between the other of the water inlets and the mixing chamber wherein:

the width of each of the tapered openings is stepped at intervals corresponding to the extent of the respective inlet in the direction of movement of the control member such that the open area changes linearly with movement of the tapered opening.

In this way, linear changes in flow are achieved with respect to movement of the control member.

According to the present invention, there is provided a water mixing valve having:

two water inlets;

a mixing chamber; and a control member defining openings for controlling flow between the water inlets and the mixing chamber; wherein the control member is non-planar and at least partly encloses the mixing chamber and; wherein the openings and water inlets are orientated such that flow from the water inlets are directed at least partly towards one another.

In this way, the mixing chamber is at least partly provided within the control member itself such that flow from the water inlets into the mixing chamber is at least partly opposed and, hence, mixing is improved.

According to the present invention, there is provided a water mixing valve having:

two water inlets with respective cup seals;

a mixing chamber;

a rotatable control member having openings for controlling flow from the water inlets to the mixing chamber, the control member having a first surface against which the water inlet seal and an opposite second surface, the openings extending between the first and second surfaces; wherein each cup seal has an axially extending annular protrusion for sealing with the first surface.

In this way, the force between the cup seals and the control member will increase less as the internal pressure from the water inlets increases. Thus, the pressure between the cup seals and the control member may be kept to a minimum, thereby reducing drag on the control member.

According to the present invention there is provided a water mixing valve having:

two water inlets;

a mixing chamber;

a rotatable control member having openings for controlling flow from the water inlets to the mixing chamber, the control member having a first surface against which the water inlets seal and an opposite second surface, the openings extending between the first and second surfaces; wherein at least the first surface comprises a low friction material.

In this way the drag between the control member and water inlets may be minimised.

According to the present invention, there is provided a water mixing valve having:

a housing formed from a first half and a second half, the first half including two water inlets, the second half including a water outlet and the first and second halves together forming a mixing chamber; and a rotatable control member inside the housing for sealing with the water inlets and having openings for controlling flow from the water inlets to the mixing chamber; wherein the first and second halves have peripheral mating surfaces between which a sealing member is sandwiched; and wherein a channel-shaped collar is provided around the outer periphery of the housing to prevent the first and second halves from separating and for maintaining the first and second halves in a sealed relationship.

In this way, the force required to hold the two halves of the housing together is perpendicular to the force holding the collar in place. Hence, the need for any great clamping force is removed and the two halves may easily be held together. Furthermore, since the two halves mate together in a predetermined fashion, the sealing member is not unduly compressed.

BRIEF DESCRIPTION OF THE DRAWINGS

FIG. 4 illustrates a stepped tapered opening for use in a control member;

FIGS. 8(a) and (b) illustrate linear control members;

FIG. 9 illustrates a cylindrical control member with stepped tapered openings;

FIG. 14 illustrates the upper or first half of the housing of the valve of FIG. 1;

DETAILED DESCRIPTION OF THE PREFERRED EMBODIMENTS

The invention will be more clearly understood from the following description, given by way of example only, with reference to the accompanying drawings.

Figure 1:
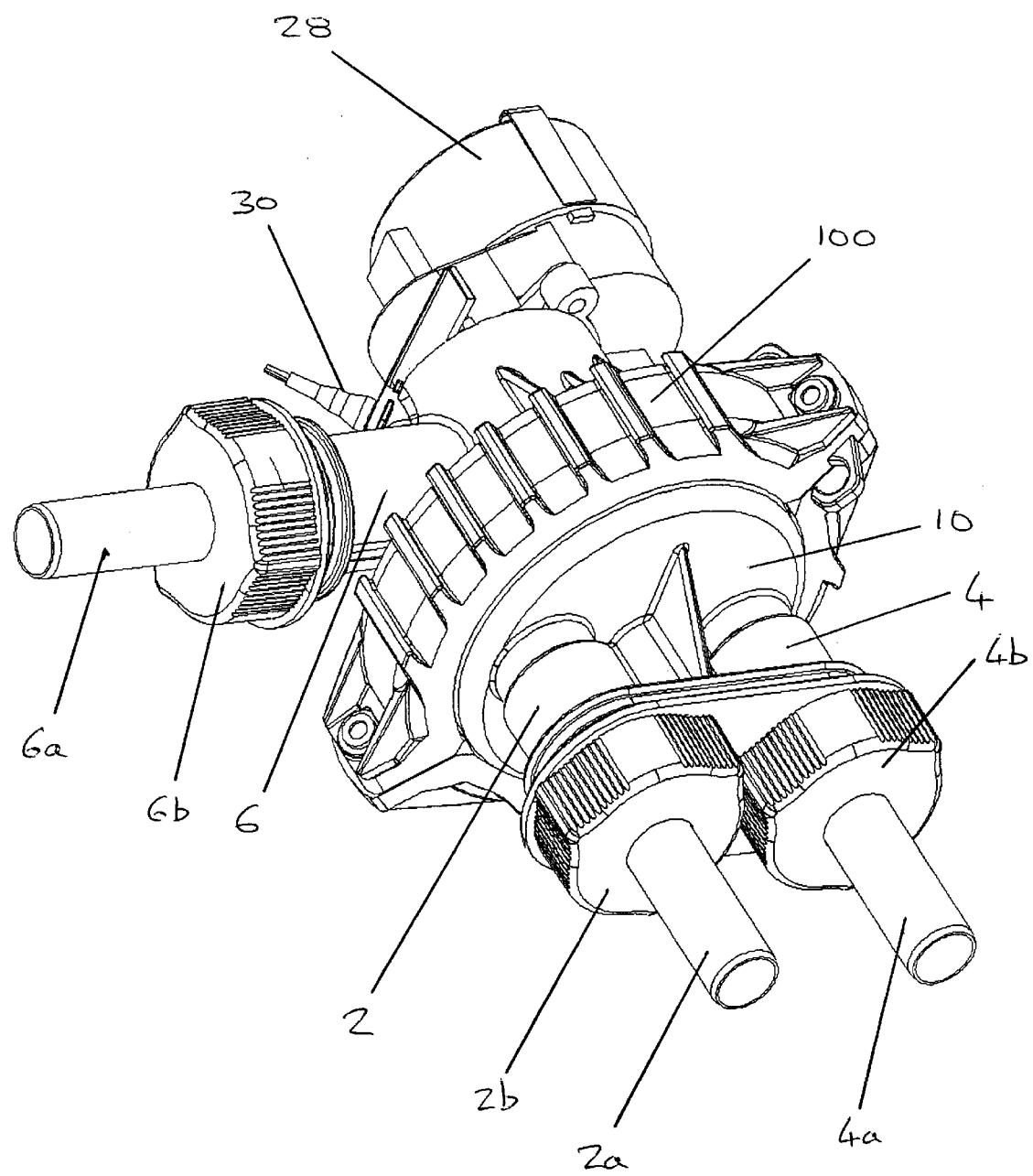
FIG. 1 illustrates a valve embodying the present invention.

Referring to FIG. 1, there is shown a water mixing valve having a first inlet 2, a second inlet 4 and an outlet 6.

Figure 2A:
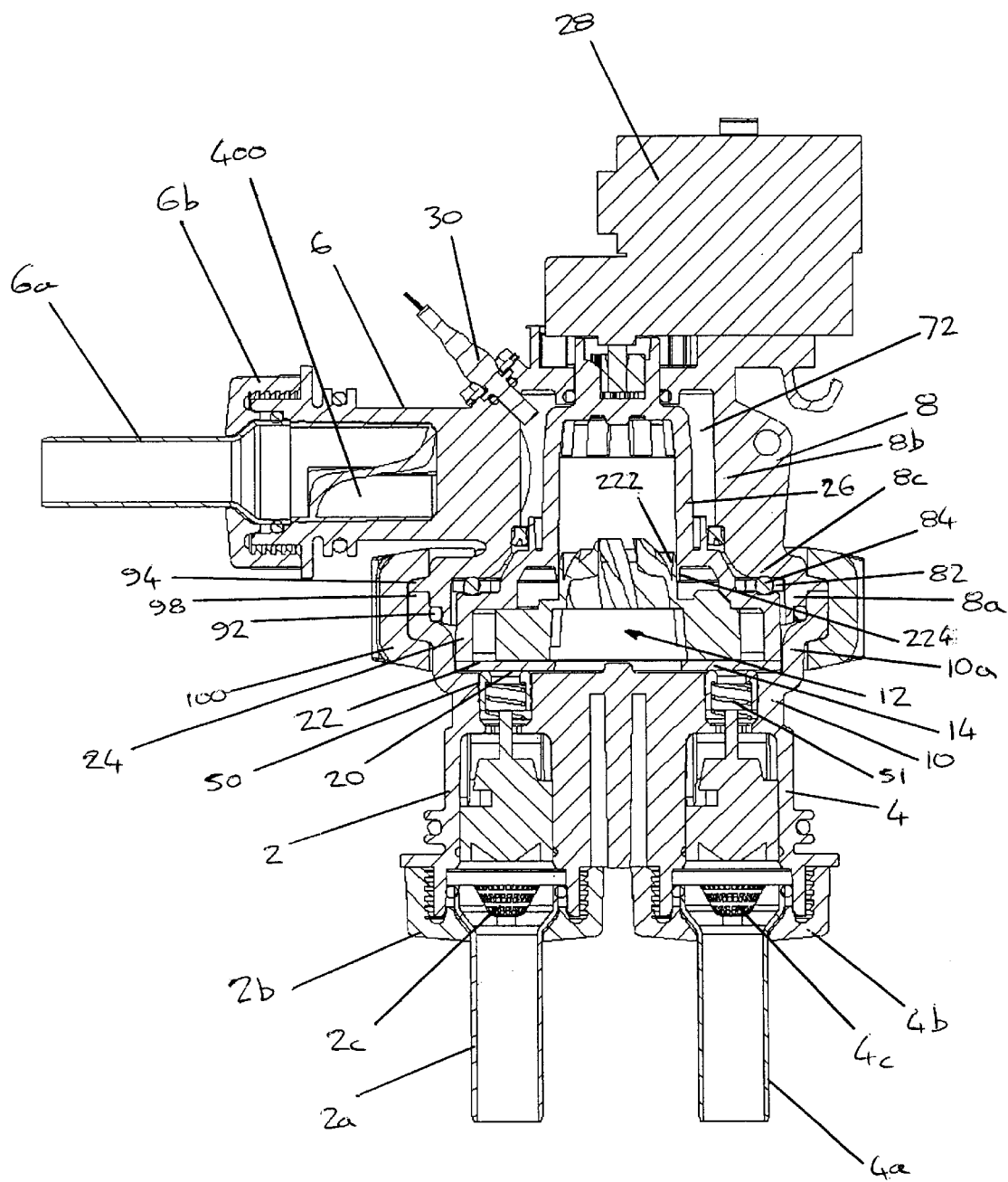
FIGS. 2(a) and (b) illustrate cross-sections through the valve of FIG. 1.

As illustrated in FIGS. 2(a) and (b), the water mixing valve includes a housing made up of a first half 8 and a second half 10 which together define a mixing chamber 12. Thus, in use, water passes into the mixing valve from the water inlets 2 and 4, is mixed together within the mixing chamber 12 and then passes out of the outlet 6.

As illustrated, the inlets 2, 4 and outlet 6 are provided respectively with pipes 2a, 4a, and 6a attached by screw caps 2b, 4b, and 6b. In this way, filters 2c and 4c are housed in the inlets and a baffle 400, to be described below, is housed in the outlet.

In order to control the ratio of water mixed from the first and second inlets 2,4, a control member 14 is provided adjacent the ends of the water inlets 2,4, thereby separating the water inlets 2,4 from the mixing chamber 12.

Figure 3A:
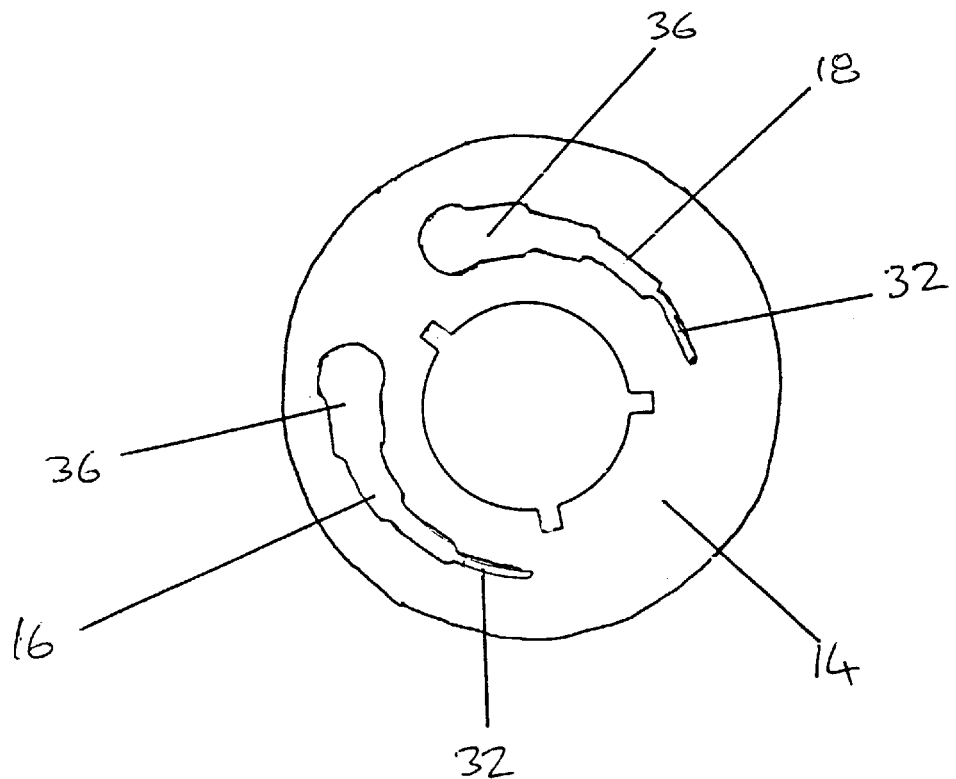
FIGS. 3(a) and (b) illustrate control members for use in the valve of FIG. 1.

As illustrated in FIGS. 3(a) and (b), the control member 14 is a plate having first and second tapered openings 16,18.

The water inlets 2,4 seal against a first surface 20 of the control member 14. The control member 14 may then be rotated so as to bring the opening 16,18 in line with the water inlets 2,4 and control the proportion of water entering the mixing chamber 12.

A second surface 22 of the control member 14 faces the mixing chamber 12. A support 24 abuts the second surface 22 of the control member 14. Formed integrally with the support 24 is a shaft 26 by which the support 24 and control member 14 may be rotated. The shaft 26 extends through a drive aperture 27 in the housing.

As illustrated in FIG. 1, a motor 28, such as a stepper motor, and gearbox is provided to rotate the shaft 26 and, hence, the control member 14. In other constructions, the shaft 26 could be rotatable via a manual mechanism.

Also illustrated in FIG. 1 is the rear connection portion of a temperature sensor 30. The temperature sensor 30 or at least its tip is located in the mixed flow of water and, when the water inlets 2 and 4 are used respectively for hot and cold water, the information derived from the temperature sensor 30 can be used to control the motor 28 and, hence, the position of the control member 14 and the temperature of the mixed flow of outlet water.

FIGS. 3(a) and (b) illustrate two different control members 14 for use in the valve. In particular, FIG. 3(a) illustrates a control member 14 having tapered openings 16 and 18 which are stepped with generally parallel sides. In contrast, the control member 14 of FIG. 3(b) has tapered openings which taper continuously from their widest ends to their narrowest ends.

Figure 3B:
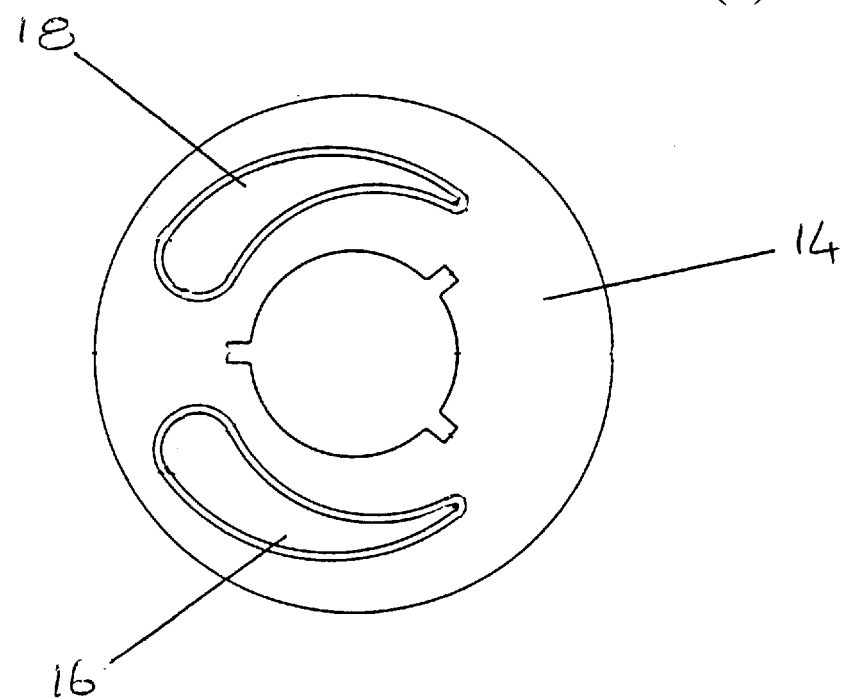

The present application recognises for the first time that using a control member such as that illustrated in FIG. 3(b) with standard water inlets results in a non-linear change in flow with respect to rotation of the control member. In particular, water flow from a water inlet is determined by the open area presented to it by a corresponding tapered opening in the control member. In this respect, movement of the tapered opening relative to the water inlet will not result in a linear change in open area. Incremental movements as an inlet first moves over the an opening cause large changes in flow due to the back pressure and proportionally large increases in available cross-sectional area for flow. On the other hand, movements of the inlet over the wider end of the opening have less effect with regard to back pressure and cause proportionally less change with regard to open cross-sectional area.

Where the position of the control member 14 is controlled electronically, appropriate compensation can be introduced in the feedback loop. However, alternatively, stepped tapered openings, as illustrated in FIG. 3(a), can be used.

As illustrated in FIG. 4, the intervals between steps corresponds to the extent of the water inlet in the direction of movement of the control member. Thus, as the water inlet moves from position A to position B, the open area presented to the water inlet (and through which water may flow into the mixing chamber 12) increases linearly with movement. In order to maintain this linear increase, a step is provided in the opening 16. In fact, the total step is provided symmetrically on the opening 16 by virtue of two steps 32a and 32b.

The total step provided by the steps 32a and 32b has a width equal to the narrowest section 32 of the opening 16. The next section 34 in the opening 16 then again has generally parallel sides. In this way, as the water inlet moves from position B to position C, the open area presented to the water inlet again increases linearly and, furthermore, increases linearly at the same rate as the narrowest section 32. The opening 16 includes a series of pairs of symmetric steps, each pair having a width equal to the width of the narrowest section 32. In this way, from the narrowest section 32 to the widest section 36, movement of the opening 16 relative to the water inlet provides a linearly increasing open area and, hence, linearly increasing flow.

Where, as illustrated, the water inlets are circular, it is possible to provide a circular section 38 as part of the widest section 36. In this way, full opening of the water inlet can be achieved so as to ensure maximum flow.

Figure 5A:
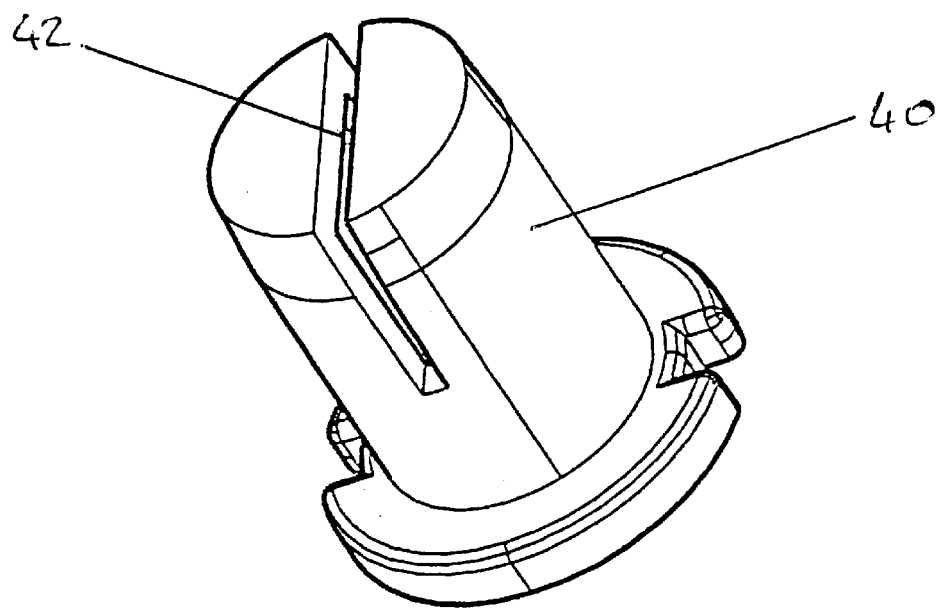
FIGS. 5(a) and (b) illustrate inserts for use with the control member.
Figure 5B:
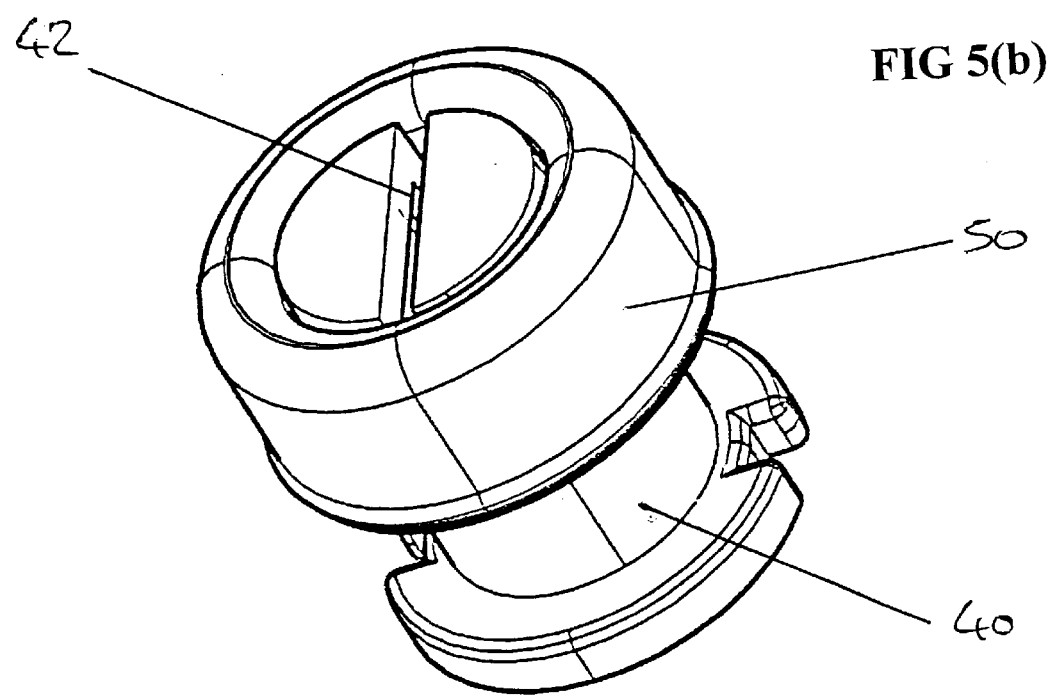
Figure 6:
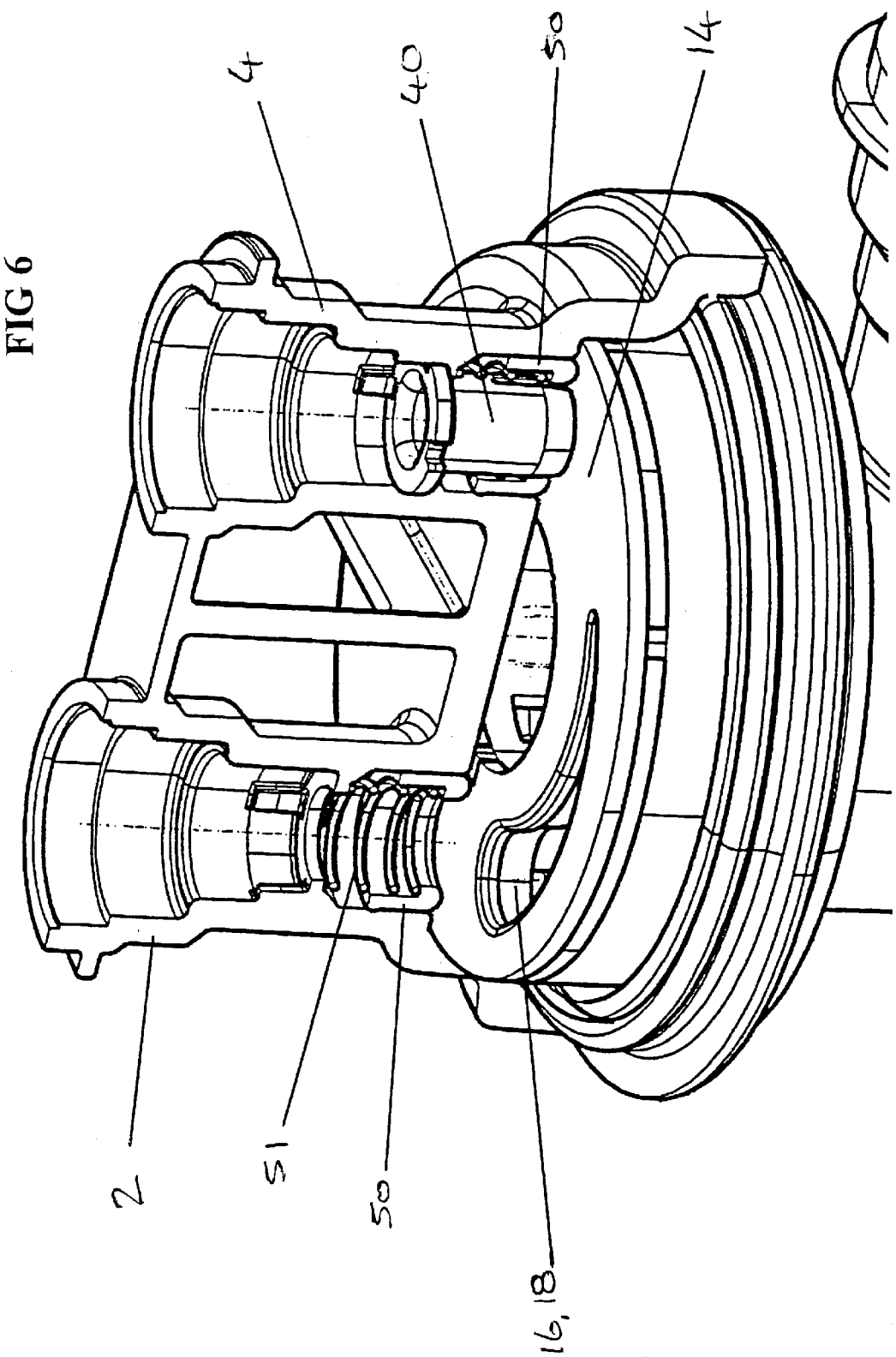
FIG. 6 illustrate an insert in the valve.

As a further alternative to the above, the control member 14 of FIG. 3(b) can be used together with inserts in the water inlets 2 and 4. A suitable insert 40 is illustrated in FIGS. 5(a) and (b). The insert may be fitted in the valve as illustrated in FIG. 6. The inserts 40 substantially fill the cross-section of the inlets and are provided with a slot-like opening 42. In particular, the inserts 40 are positioned in the inlets 2 and 4 so as to present their slotted openings 42 adjacent the tapered openings 16,18 of the control member 14. Furthermore, the slotted openings 42 are orientated perpendicular to the direction of movement of the tapered openings 16,18. Thus, in the illustrated embodiment, the slotted openings 42 are orientated in a radial direction relative to the valve and control member 14.

By using water inlets 2,4 having slotted cross-sections, the increase in open cross-sectional area into the mixing chamber 12 is approximately proportional to the width of the tapered openings 16,18 presented to the water inlet. Thus, mixing of the water from the water inlets 2,4 is approximately proportional to movement of the valve and control member 14.

Use of the slotted openings is particularly advantageous for systems having large differences in pressure between the two inlets. For instance, when used with combi heaters, cold to hot water pressure can have a ratio as much as 33:1.

Referring again to FIGS. 3(a) and (b), it will be seen that the widest sections 36 of the openings 16,18 are positioned closer to one another than the narrowest sections 32. This enables the control member 14 to turn to a position at which one of the openings 16,18 provide maximum open area to one of the water inlets 2,4 whilst the other of the water inlets 2,4 is still fully closed. By providing a good seal between the water inlets and the sealing surface of the control member 14, this enables the mixing valve to provide maximum flow from one of the inlets 2,4 whilst closing off the other inlet 2,4. This is a significant advantage over previous valve arrangements which, when positioned for maximum flow from one inlet, allow a slight flow from the other inlet. For arrangements where the mixing valve mixes hot and cold water, the arrangement of FIGS. 3(a) and (b) allows either maximum hot or maximum cold to be selected.

In order to maintain maximum flow through the mixing valve, the openings 16,18 are positioned relative to one another accordingly. In the illustrated arrangement, the water inlets 2,4 are diametrically opposed across the axis of rotation of the control member 14. This enables the control member 14 to operate symmetrically in either direction.

Upon rotation of the control member 14, the following operation is preferred. The control member 14 is rotated clockwise as illustrated in FIG. 3 such that the first inlet 2 is exposed to the widest section 36 of the opening 16. At this time, the second inlet 4 is still closed by the control member 14. Upon further rotation of the control member 14, simultaneously, as the next narrower section of the first opening 16 moves over the first inlet 2 and progressively restricts its flow, the narrowest section 32 of the second opening 18 moves across the second inlet 4 and progressively increases the flow from this inlet by the same amount. Eventually, upon further rotation of the control member 14, the second inlet 4 reaches the widest section 36 of the second opening 18 to allow maximum flow from the second inlet 4, whilst the first inlet 2 is closed by the control member 14. Of course, further rotation of the control member 14 will then open the second inlet 4 with the first opening 16. Also, anti-clockwise rotation of the control member 14 will have a similar effect.

As an alternative, instead of providing symmetric operation of the control member 14, it is possible to position the tapered opening 16,18 in the control member 14 such that one of the tapered openings 16,18 can provide full and unmixed flow.

Figure 7:
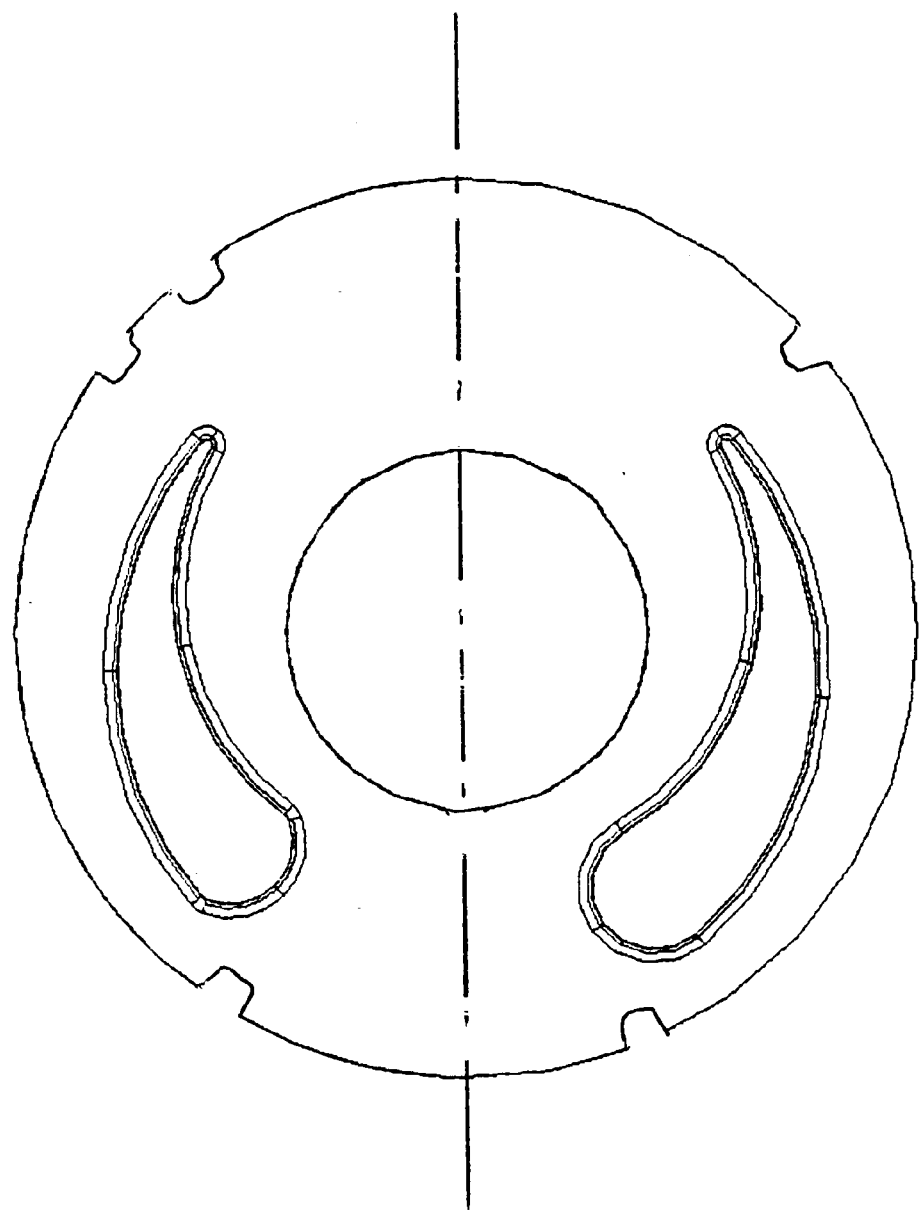
FIG. 7 illustrates an asymmetric control member.

It will be appreciated that during normal start-up, the control member 14 will be rotated through the full-cold position then through the mixing positions with progressively more hot water until a desired temperature is achieved. Thus, by providing the full cold position, the mixer valve provides an unnecessary amount of cold water to the outlet during start-up. For this reason, it is proposed that, for the normal direction of rotation of the control member 14 for start-up, the control member will move directly from the off position to a mixing position. To achieve this, it is sufficient for the tapered opening 16,18 to be spaced apart at the widest section by the size of the inlets and at their narrowest sections by twice the size of the inlets, the spacing between the narrower sections of the tapered opening 16,18 being non-symmetrically positioned. However, the narrowest sections are preferably spaced apart by approximately 3 times the size of the inlets. A suitable control member is illustrated in FIG. 7.

By this arrangement, should the user particularly require the full cold position, the control member 14 can be rotated from the off position in an opposite direction so as to make use of the maximum flow position of the other tapered opening 16,18.

With respect to the stepped tapered openings, these can, of course, be applied to other types of control member. For instance, as illustrated in FIGS. 8(a) and (b), the openings can be arranged in a plate for linear motion. Similarly, as illustrated in FIG. 9, they can be located in a cylindrical control member.

Figure 10A:
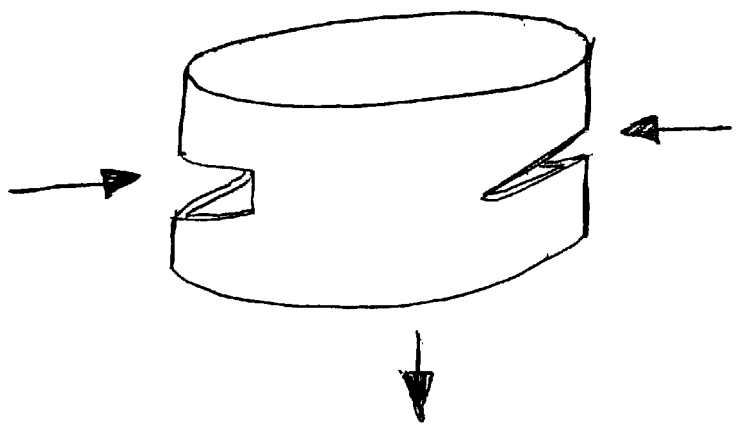
FIG. 10(a) to (c) illustrate control members which at least partially enclose a mixing chamber.
Figure 10B:
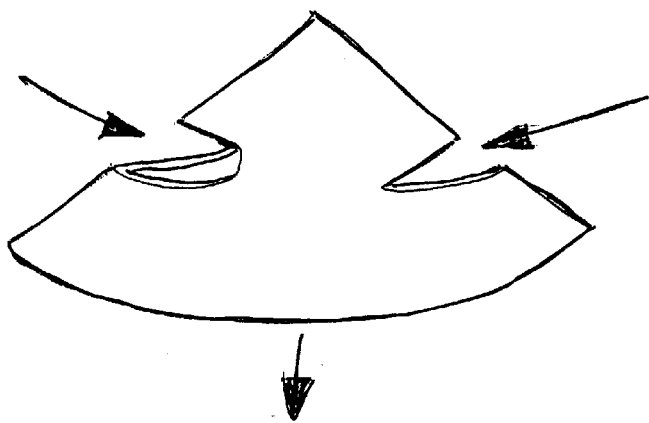
Figure 10C:
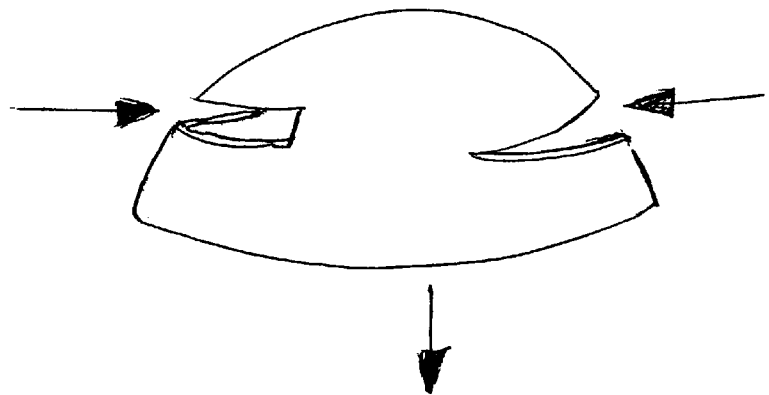

Following on from FIG. 9, FIGS. 10(a), (b) and (c) illustrate various forms of non-planar control members which at least partly enclose the mixing chamber. The particular illustrated examples are respectively cylindrical, conical and hemispherical. These arrangements are particularly advantageous since the water inlet flows are naturally at least partly opposed. Hence, water inlet flows passing through the openings of the control member will naturally mix with one another before leaving the mixing chamber without any special features for creating mixing within the chamber.

Figure 11:
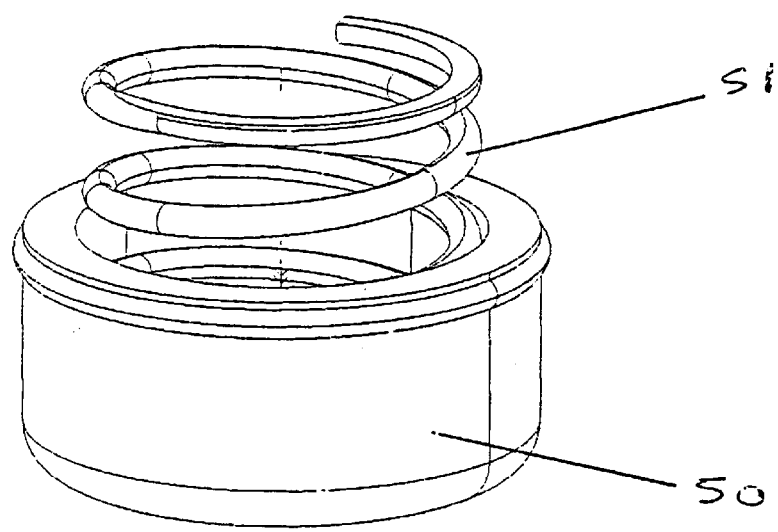
FIG. 11 illustrates a cup seal for use in the valve of FIG. 1.

FIG. 11 illustrates the sealing components at the ends of each of the water inlets 2,4. A cup seal 50 is provided internally with a coil spring 51. The cup seal 50 seals with the inner periphery of an inlet 2,4 and is sprung forwardly by the coil spring 51 so as to maintain a seal with the control member 14.

As explained above, it is important that the water inlets seal effectively with the first surface 20 of the control member 14. In particular, when the control member 14 is in the position in which both inlets are shut off, the cup seals 50 must effectively seal with the control member 14. Furthermore, they may remain in this position for a considerable amount of time. In view of this, the springs provide a strong sealing pressure between the cup seals 50 and the control member 14.

According to the illustrated arrangement, in order to reduce the number of parts and simplify operation, the cup seals 50 seal directly onto the moving control member 14. Using cup seals with a large inwardly extending sealing surface achieves good sealing, but there is significant friction between the sealing surface and the control member 14. This can cause resistance to rotation of the control member 14 and also induces wear in the cup seal. On the other hand, by reducing the inwardly extending sealing surface of the cup seal, insufficient pressure may be produced between the sealing surface and the control member 14. Furthermore, inlet pressures can vary considerably depending on the particular installation. Mains water supply in the U.K. can reach 16 bar though is supplied to houses with 12 bar pipe. However, in practice, in a domestic installation, pressure might vary from 0.1 bar to 10 bar, some boiler manufactures specifying that all fittings must be specified to 10 bar.

Hence, the cup seal 50 preferably provides a good sealing force for a variety of different pressures, but without creating undue frictional forces with the control member 14.

Figure 12:
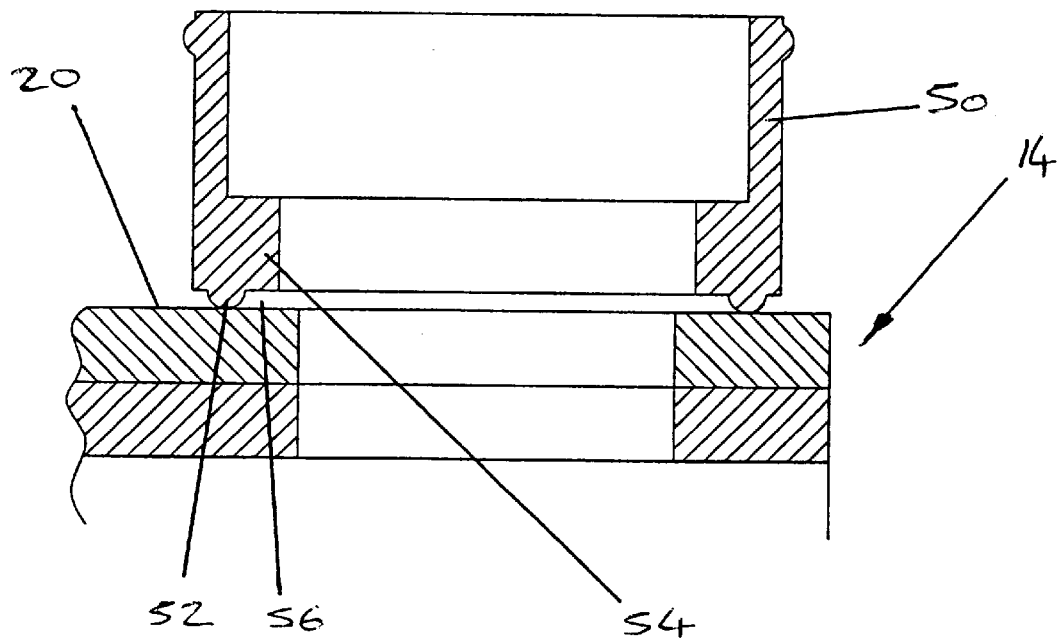
FIG. 12 illustrates a cross-section through an alternative cup seal.

FIG. 12 illustrates a cup seal 150 which includes an annular protrusion 152 extending from what would have otherwise been the inwardly extending sealing surface 154.

The annular protrusion 152 thus forms the main seal with the control member 14. However, the inwardly extending sealing surface 154 will also provide some sealing effect together with the annular protrusion 152.

By providing the annular protrusion 152, however, a space 156 is formed under the inwardly extending portion 154. This space 156 helps to accommodate variations in water pressure and reduce frictional drag between the cup seal 150 and the control member 14. In particular, water is able to feed into the space 156 under the inwardly extending portion 154. Thus, in this way, as the water pressure in the inlet increases, there is an increase in pressure in the space 156 under the inwardly extending portion 154 which will counteract the effect of the pressure forcing the cup seal 150 onto the control member 14. In this way, as the water pressure in the inlet increases, the force between the cup seal 150, in particular the annular protrusion 152, and the control member 14 does not increase as much. This assists in providing a constant sealing force between the cup seal 150 and the control member 14. The sealing force may thus be kept towards its minimum so as to minimize the drag between the cup seals 150 and the control member 14.

The cup seals 50,150 may additionally be coated with a low friction material such as PTFE.

As described above and illustrated in FIG. 2(a), the inlets 2 and 4 seal directly with the control member 14. This is advantageous, since it requires a reduced number of parts and is of a simple construction. However, as mentioned above, there are problems in providing a good seal between the inlets 2,4 and the control member without producing undue drag and wear between seals of the inlets 2,4 and the control member 14.

In the preferred embodiment illustrated in FIGS. 2(a) and (b), the control member 14 is constructed from steel coated with a friction reducing material such as PTFE on its first surface 20. This allows the use of a good sealing pressure even with conventional cup seals 50.

Figure 13A:
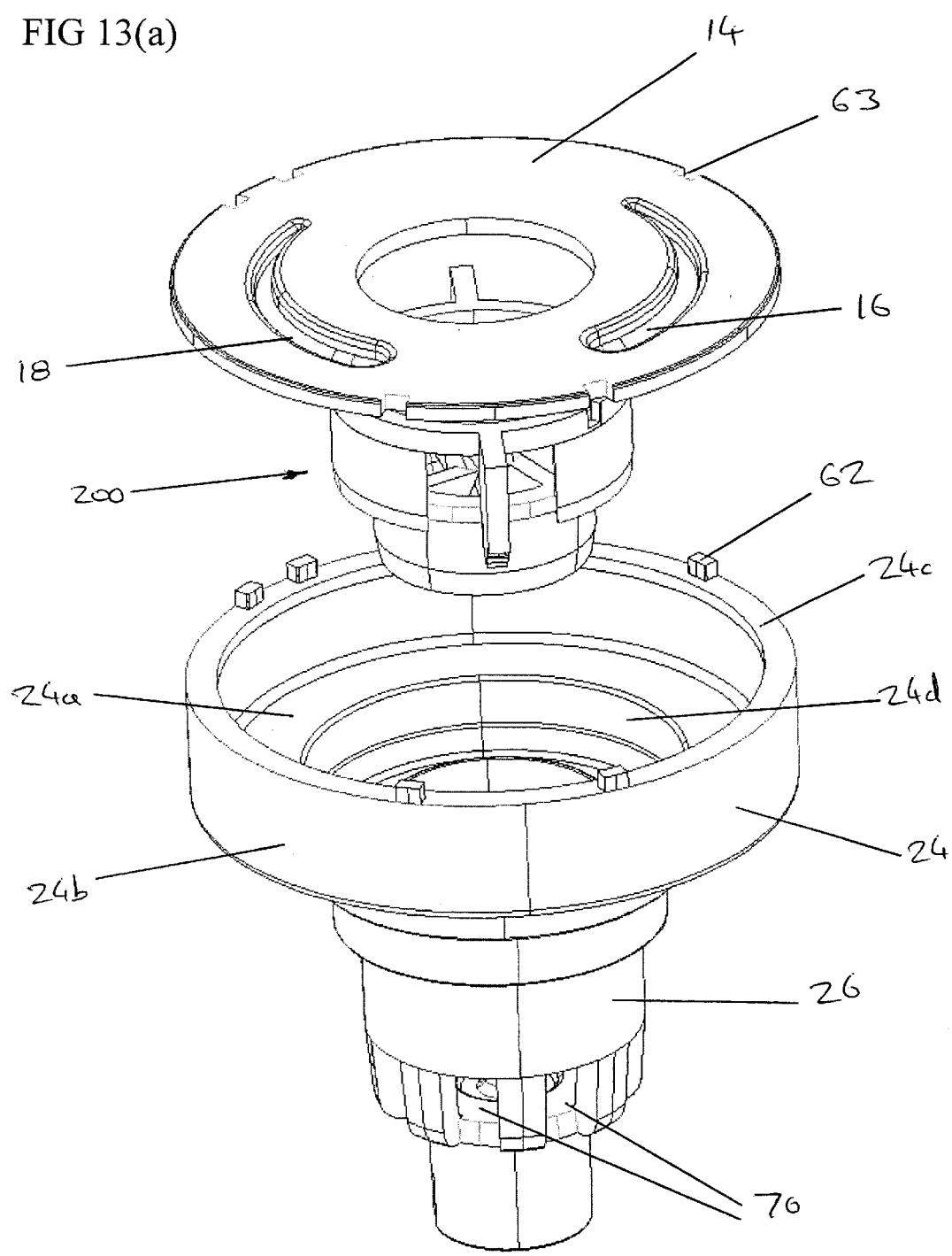
FIGS. 13(a) and (b) illustrate a control member and its support.

FIGS. 13(a) and (b) illustrate the support structure 24 and shaft 26, together with the control member 14. They also illustrate a mixing feature 200 to be described below.

The support structure 24 includes a base wall 24a and a peripheral wall 24b. The control member 14 is supported at its outer periphery by the top surface 24c of the peripheral wall 24b. In this way, the mixing chamber 12 is formed within the support structure 24 and the control member 14.

As illustrated, protrusions 62 are provided on the top surface 24c of the peripheral wall 24b. These protrusions 62 engage in recesses 63 around the outer periphery of the control member 14 so that the control member 14 may be pressed against the support structure 24 and fixed rotationally.

As illustrated, shaft 26 takes the form of a hollow cylinder having a plurality of outlet openings 70 at its end furthermost from the control member 14. It extends from the outer surface of the base wall 24a, surrounding a central aperture 24d in the base wall 24a.

In use, water flows through the tapered openings 16 and 18 into the mixing chamber 12 defined by the support structure 24 and control member 14. The mixed water then passes through the hollow shaft 26 and out of the outlet openings 70 into the outlet chamber 72 defined by the first half 8 and illustrated in FIG. 2(a). From the outlet chamber 72, the mixed water then flows out from the outlet 6.

As illustrated, between the support structure 24 and the control member 14, a mixing feature 200 is positioned.

Figure 2B:
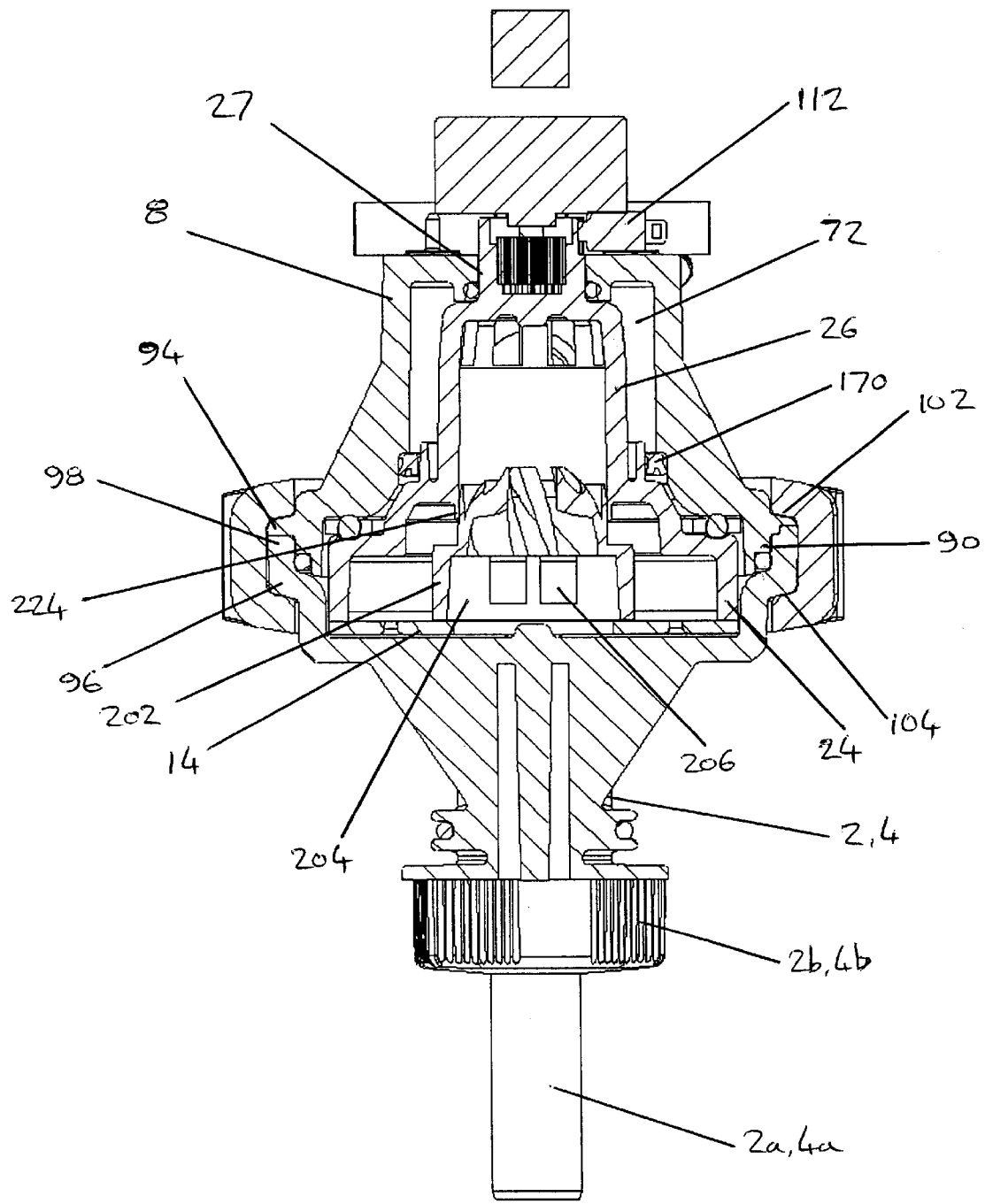

The mixing feature 200 includes an annular wall 202 which, when the control member 14, support structure 24 and mixing feature 200 are assembled, extends from the base wall 24a to the second surface 22 of the control member 14. The annular wall 202 follows a path positioned inwardly of the openings 16 and 18 and is preferably generally circular. Thus, as illustrated, for instance in FIG. 2(b), the annular wall 202 forms a central mixing cavity 204 with an outer peripheral channel.

Windows 206 are provided in the annular wall to allow a flow of water from the apertures 16 and 18 and outer peripheral channel into the central mixing cavity 204 and down through the hollow shaft 26.

The mixing feature 200 is also provided with a pair of generally radially extending walls 208. As illustrated, these walls are diametrically opposed with respect to the central mixing cavity 204 and the annular wall 202. Once assembled with the control member 14 and support structure 24, these opposed walls extend substantially to the base wall 24a, the peripheral wall 24b and the second surface 22 of the control member 14. Thus, the annular peripheral channel formed between the annular wall 202 and the peripheral wall 24b is divided into a pair of generally semi circular channels. Each of these channels is positioned opposite a respective aperture 16,18. In this way, irrespective of where the inlets 2 and 4 are positioned with respect to the apertures 16 and 18, water flowing through the apertures 16 and 18 will always flow into its respective channel.

The preferred and illustrated embodiment incorporates a window 206 at each end of each channel such that a window 206 is positioned either side of each opposed radial wall 208. This arrangement is very significant for achieving early and effective mixing of the hot and cold water.

It is well established that effective mixing of fluids is difficult to achieve over short distances of flow due to the fact that each fluid takes its own flow path with only relatively small mixing occurring at the boundary between the two flows.

Without the mixing feature 200, flows from the apertures 16 and 18 will tend to remain separate all the way through the hollow shaft 26 and out of the outlet 6.

It is possible to redirect the flows from the apertures 16 and 18 towards one another. For instance, the illustrated annular wall 202 could be replaced by an annular wall having two oppositely facing windows such that flows from the apertures 16 and 18 are directed directly towards one another. However, it has been found that when the two opposing flows encounter each other, they merely seek an easier path and, hence, are merely redirected down the shaft 26 again with little mixing.

According to the illustrated arrangement, flow from one of the apertures 16,18 and its corresponding windows 206 enters the central mixing cavity 204 in a direction approximately parallel to the flow from the other of the apertures 16,18 and its corresponding windows 206. Also, flow from each of the apertures 16 and 18 is split between its two windows 206 and enters the central mixing cavity in two opposing directions. As a result of the two pairs of opposing flows entering the central mixing cavity 204, four generally spiral flow paths are formed. In particular, each of the flows, upon encountering the three other flows, is turned away towards the side peripheral wall 24b and continues to turn in that direction to form a vortex. The formation of the four vortices greatly increases the quantity of water which contacts (at the edge of its flow) water from the other flows. In other words, enhanced mixing of the fluid flows is achieved.

It will also be appreciated that, with a window 206 at each end of a channel, as the control member 14, support structure 24 and mixing feature 200 are rotated relative to the inlets, the quantity of flow from one window 206 will vary inversely to the quantity of flow from the other window 206 of the same channel. Also, when the fluid flow from one of the inlets 16,18 is strongest through one window 206, the strongest fluid from the other aperture 16,18 will be from the approximately diametrically opposed window 206 of the other channel. In this way, the arrangement of the illustrated mixing feature 200 results in an approximately balanced and effective mixing arrangement under all conditions.

As illustrated, an extension 210 of the mixing feature 200 protrudes through the central aperture 24d in the base wall 24a and into the hollow shaft 26. The extension 210 is generally hollow so as to maintain the central aperture for flow from the central mixing cavity 204 to the hollow shaft 26. Within the extension 210 vanes 212 extend inwardly. The vanes 212 have a generally spiral or helical form so as to rotate the water flow passing from the mixing feature 200 into the down stream portion of the hollow shaft 26. This rotation further enhances mixing of the hot and cold water flows.

The positions of the four vanes is of technical significance.

As explained above, the flow from each window 206 entering into the central mixing cavity 204 is deflected towards the peripheral wall 24b so as to form a generally spiral flow. This flow then tends to move axially down through the mixing feature 200 into the shaft 26. The vanes 212 are positioned so as to most effectively obstruct the spiral flow of each vortex. Thus, at the upstream end of the hollow shaft 26, proximate with the mixing cavity 204, the vanes 212 are positioned to cross approximately the central axes of the four vortices. As an approximation of all of the various mixing conditions which may arise within the central mixing cavity 204, this means that the vanes 212 are arranged symmetrically around the opening to the shaft 206 with pairs of vanes arranged generally symmetrically across the plane between the radially opposed walls and the windows 206 either side of them.

As a further feature for improving mixing, the inner wall 214 of the extension 210 between the vanes 212 is tapered. The inner wall 214 defines an internal cross-section for the extension. The internal diameter of the inner wall 214 and hence the internal cross-section of the extension is reduced progressively along the length of the vanes. This constricts and accelerates the flow. Furthermore at the end of the mixing feature 200, the flow path opens out again to the full internal diameter of the shaft 26. In this way, water flowing through the extension 210 into the hollow shaft 26 encounters a throttle or venturi. It is constricted and accelerates as it passes into the hollow shaft 26.

To maintain the rotating mixing action, it will be seen that the vanes 212 extend beyond the point to which the inner wall 214 extends. In this way, the venturi action occurs between the vanes 212 whilst they are still rotating the flow. This again contributes to the improved mixing action of the mixing feature 200.

In the preferred embodiment, the vanes 212 do not extend to the centre of the extension 210, but leave a central space. The width or diameter of this space may be kept constant along the length of the vanes, despite the tapering wall 214.

Of course, it would be possible to form the mixing feature 200 integrally with the support structure 24. However, due to the complexity of the resulting shape, it is preferred to mould the support structure 24 and mixing feature 200 from two parts. It is then important that these two parts should be connected together in a secure manner and in a manner which resists flow of water outside the extension 210 into the hollow shaft 26.

As illustrated, the outer surface 216 of the extension 210 reduces in diameter along with the inner surface 214. However, the extension 210 is provided with an axially extending wall 222 which continues at approximately the same diameter as the main body of the extension 210. In fact, the extending wall 222 does also curve inwards slightly for reasons which will become clear below. This forms a recess 218 between the outer surface 216 and the wall 222. In addition, as illustrated in FIGS. 2(a) and (b), a radially extending wall 224 extends from the hollow shaft 26 towards the mixing feature 200. The walls 222 and 224 being of generally smaller thickness than the other walls of the device, are able to flex resiliently to a limited degree. Therefore, the wall 222 of the mixing feature 200 can be mounted as a push fit with the wall 224. This provides a secure connection which also effectively resists water flow.

As illustrated, a radially protruding extension 220 is provided on one of the radially opposed walls 28 to be received in a corresponding (though not illustrated) recess in the support structure 24. This secures the mixing feature rotationally.

Figure 13B:
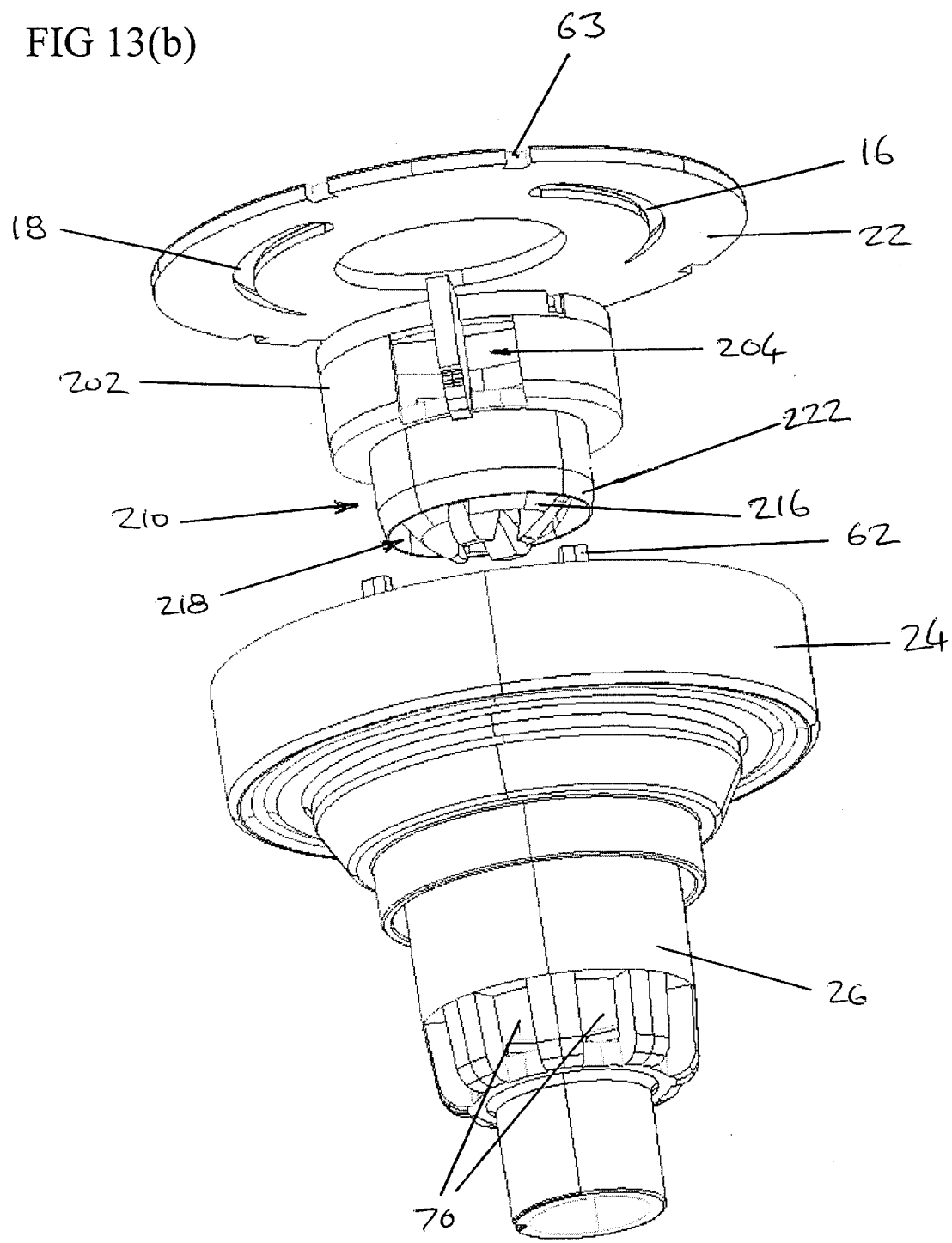
FIG. 13(c) illustrates the mixing feature of FIGS. 13(a) and (b)
FIGS. 13(d) and (e) illustrate an alternative control member and its support.
Figure 13C:
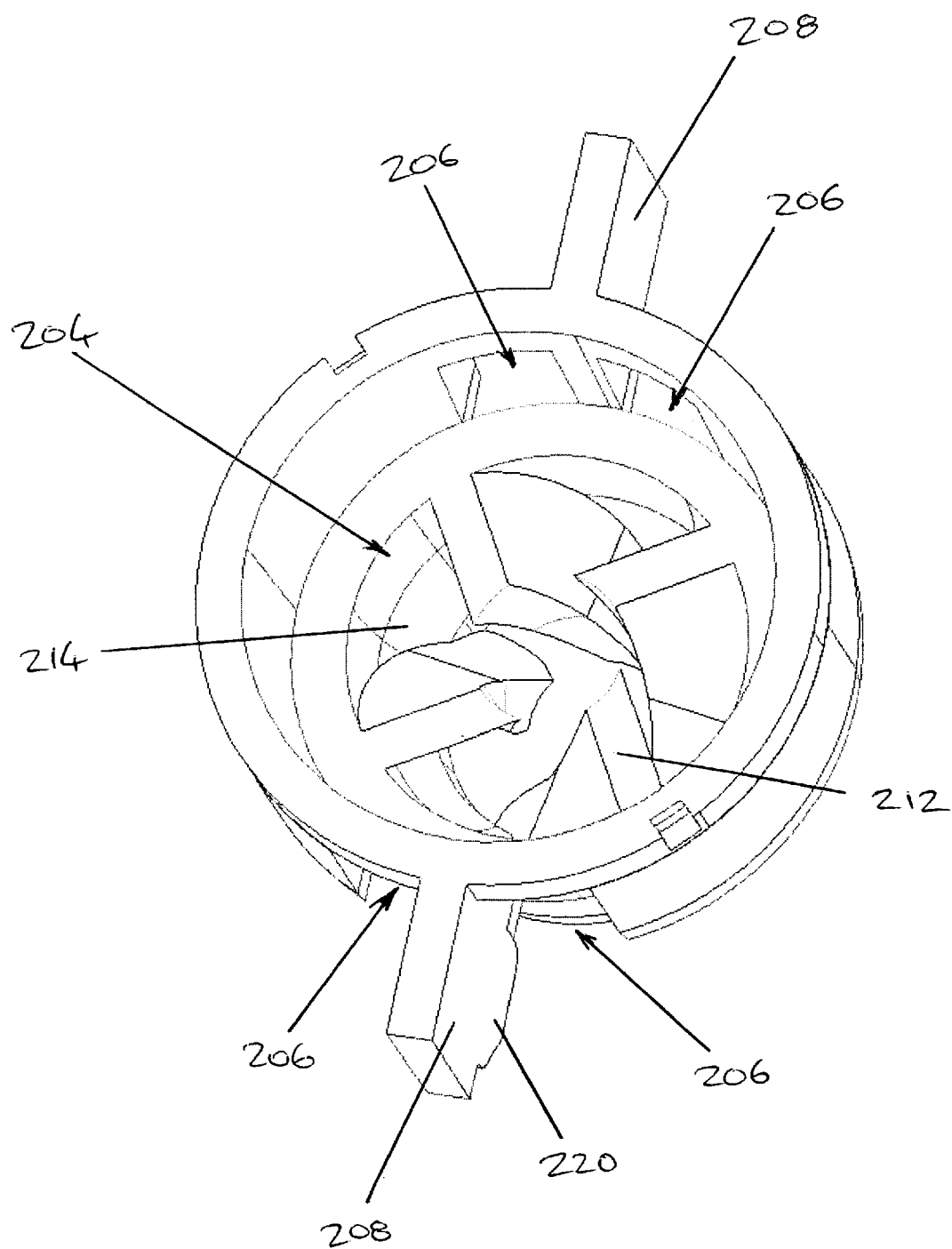
Figure 13D:
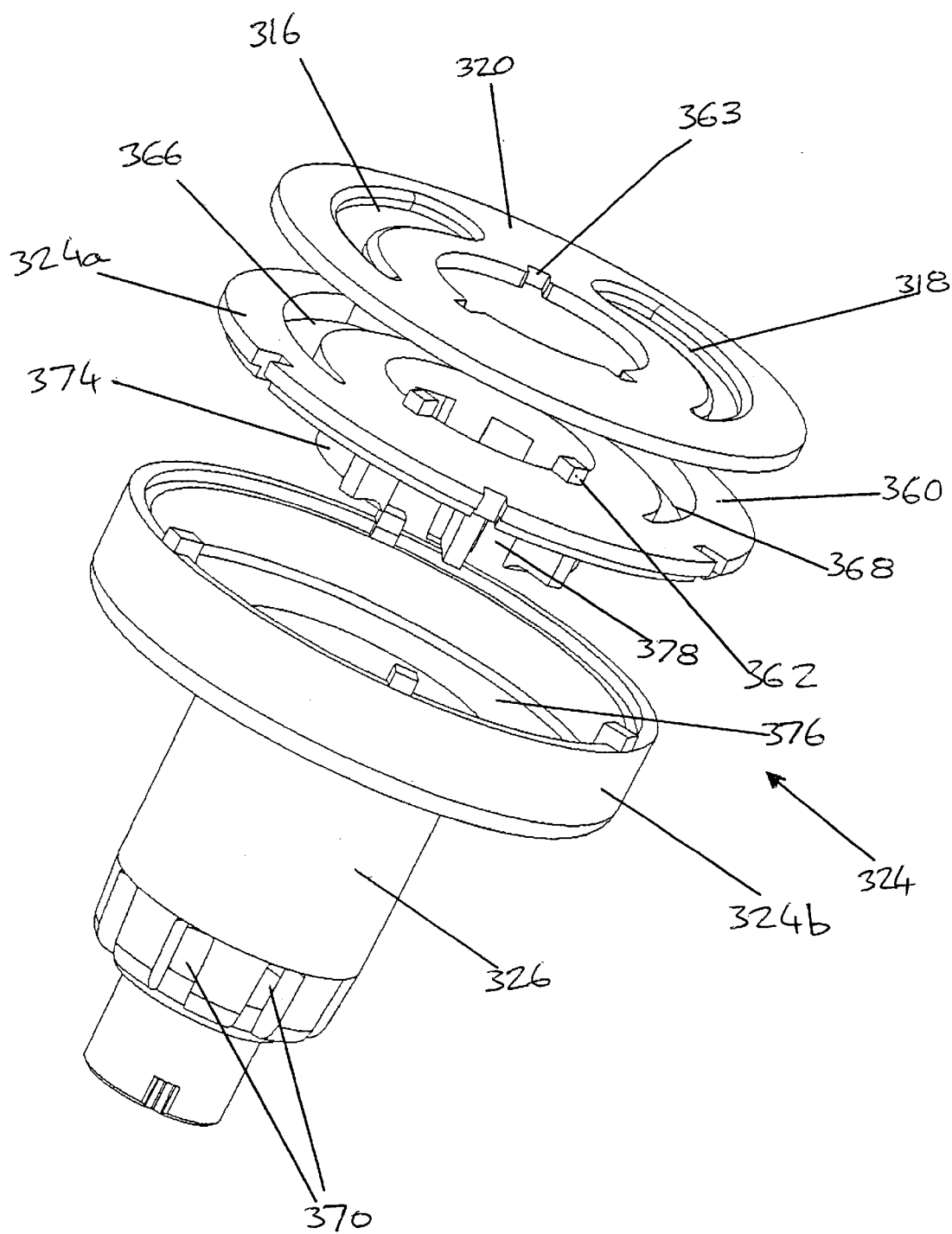
Figure 13E:
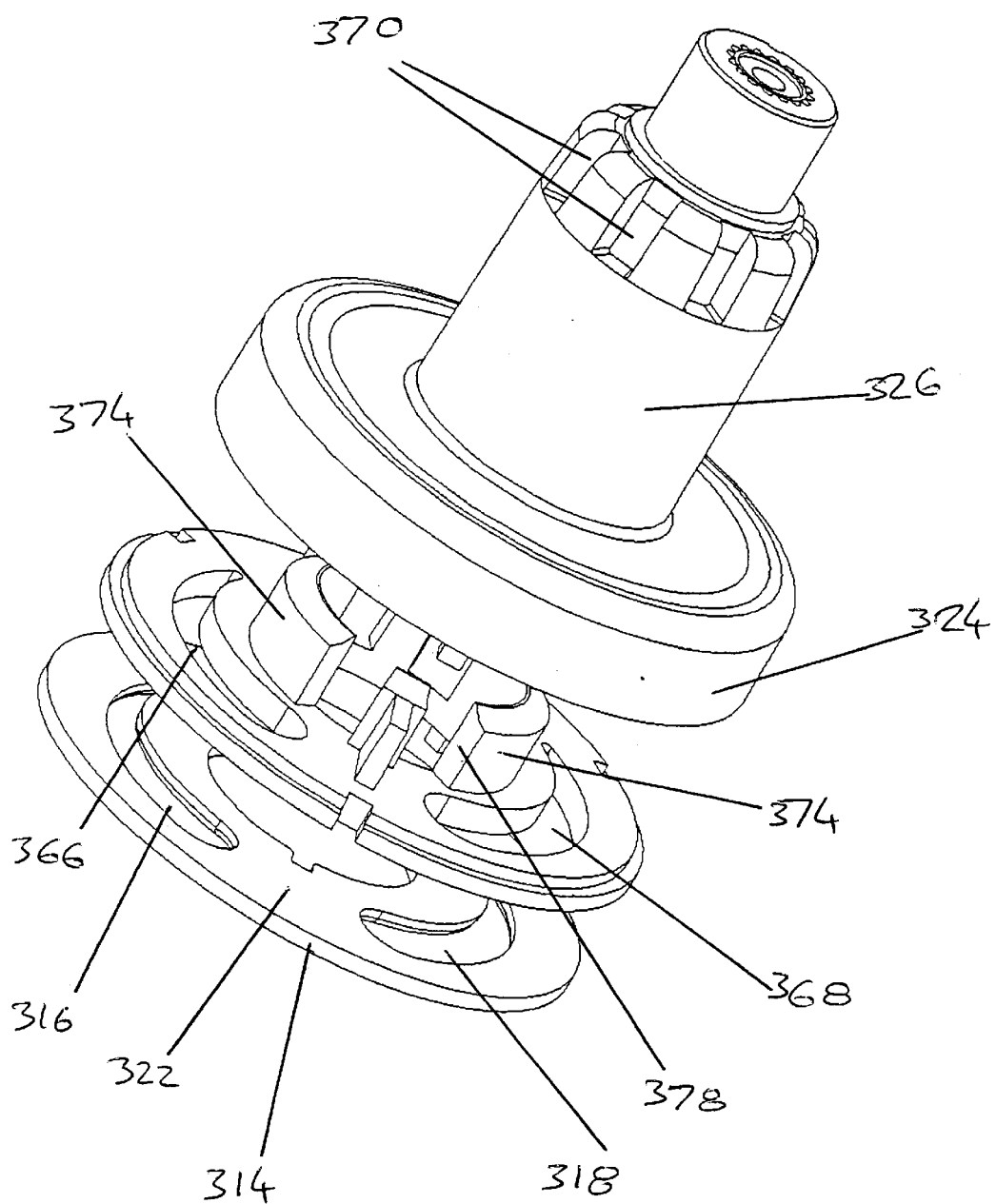

FIGS. 13(d) and (e) provide an alternative to the embodiment described with reference to FIGS. 13(a) to (c).

Alternative control members may be constructed entirely of FEP, an injection-moulding grade of PTFE. It is also possible to use any potable water safe low friction material such as PTFE itself, Molybdenum loaded +PTFE, PTFE or Molybdenum Loaded Acetal. Alternatively, a ceramic part could be used.

Clearly, the control member 314 must provide a space behind its surface 322 to form the mixing chamber. Furthermore, means are required to rotate the control member 314. However, it is not possible to provide an alternative control member made from one of the materials mentioned above which is of sufficient strength. It would be possible to provide such friction reducing materials embedded in other materials, but the friction reducing properties are thereby compromised.

Thus, for the alternative control members discussed above, it is proposed to provide a separate support structure 324 which as illustrated in FIGS. 13(d) and (e) can be constructed from two parts 324a,324b. It would be possible to coat this support structure 324 with a suitable friction reducing material as mentioned above rather than provide a separate control member 314. However, for ease and reduced cost of production, it is desired to construct the support structure 324 from a plastics material. In this respect, it is not possible or is at least extremely difficult to coat a suitable plastics material with a suitable friction reducing material, because of the heat requirements to cure the coating material. Therefore, it is proposed to provide the control member 314 as a self-supporting component which is then additionally supported by the support structure 324 to withstand the additional forces experienced during use. The control member 314 may be attached to the support structure 324 in any appropriate way. Indeed, a previously constructed self-supporting control member 314 may be inserted into the mould of the support structure 324 such that the support structure 324 is then moulded integrally with the control member 314 by a process of insert moulding.

In this way, materials appropriate for giving the control member 314 appropriate strength can be used for the support structure 324, whilst the surface 320 of the control member 314 may be made of an appropriate material to reduce friction and wear with the inlets 2,4. This may be particularly important when the support structure 324 is also integrally formed with the shaft 326, since the shaft 326 must transmit any torque required to rotate the control member 314.

FIGS. 13(d) and (e) illustrate the support structure 324 and shaft 326, together with a control member 314.

The support structure 324 includes a support surface 360 against which the second surface 322 of the control member 314 abuts. As explained above, the control member 314 could be formed integrally with the support structure 324. However, as illustrated, protrusions 362 are provided to engage in recesses 363 in the control member 314 so that the control member 314 may be pressed against the support structure 324 and fixed rotationally.

The support structure 324 includes orifices 366,368 corresponding to the tapered openings 316,318, the orifices 366,368 may be larger than the opening 316,318, but should be sufficiently close in size so as to provide mechanical support.

As illustrated, as with the embodiment of FIGS. 13(a) to (c), shaft 326 takes the form of a hollow cylinder having outlet apertures 370 at its end furthest from the control member 314.

Thus, water flowing through tapered openings 316 and 318 passes through the orifices 366,368 into the mixing chamber 312 defined by the support structure 324 and then into the hollow shaft 326. The mixed water then passes out of the outlet apertures 370. A housing equivalent to that illustrated in FIGS. 2(a) and (b) may be provided with a chamber similar to outlet chamber 72. Water flows from the outlet apertures 370 into the outlet chamber and on out from an outlet.

As illustrated in FIGS. 13(d) and (e), annular walls 374 extend inwardly of the mixing chamber 312 from opposite the support surface 360 of the support structure 324. These annular walls 374 extend to a face 376 of the support structure 324 around the periphery of the hollow opening of the shaft 326. In this way, the inner section of the support surface 360 of the support structure 324 is additionally supported, thereby reducing its tendency to flex under high inlet water pressures.

As illustrated, the annular wall 374 include breaks 378 allowing flow of water through to the hollow shaft 326. In this way, water cannot flow directly from the tapered opening 316,318 into the shaft 326. The water must first flow around parts of the annular wall 374. This assists in mixing. Furthermore, when the water then flows through the breaks 378 in the annular walls 374, flows of water are directed towards one another, thereby further increasing mixing.

It is possible to introduce further features on the breaks 378 or within the inner walls of the shaft 326 (for instance as described for the mixing feature 200) so as to further encourage mixing.

For either the arrangement illustrated in FIGS. 13(a) to (c) or that illustrated in FIGS. 13(d) and (e), it is necessary to provide a rotatable mount by which the control member rotates relative to the water inlets. The control member is rotated by the hollow shaft which extends out of the drive aperture 27 of the housing and is driven, for instance, by a stepper motor 28. Hence, the most straightforward approach for mounting the support structure is to provide bearings for the hollow shaft in a conventional manner. However, since the control member has to resist pressure from the water inlets at a relatively large radius, there are problems in this. In particular, considering the arrangement of FIGS. 13(a) to (c), the pressure exerted by the water inlets 2,4 is towards the outer periphery of the control member 14 and, hence the control member 14 tends to deflect. Furthermore, the inlet pressures at the water inlets 2,4 may be substantially different. Indeed, this will naturally occur when the control member 14 is set so as to allow a lot of flow through one inlet and a little flow through the other inlet.

In order to overcome these problems, as illustrated in FIGS. 2(a) and (b), a thrust race 80 is provided towards the outer periphery behind the second surface 22 of the control member 14. In particular, in the illustrated embodiment, the thrust race 80 bears against the back of the support structure 24, along the outer surface of the base wall 24a.

The thrust race 80 is illustrated in FIG. 14, which shows the open side of the first half 8 of the housing. The thrust race 80 includes a cage 82 holding captive a plurality of rotatable components 84. Preferably (and as illustrated), the rotatable components 84 are ball bearings such that the thrust race 80 is formed as a ball race. Preferably, the cage 82 is a moulded plastics material component holding the ball bearings 84 captive.

As illustrated in FIGS. 2(a) and (b), the first half 8 and the second half 10 of the housing together form a first generally cylindrical wall 8a,10a defining an inlet cavity for receiving the peripheral wall 24b of the support structure 24. The first half 8 also includes a second generally cylindrical wall 8b defining the outlet cavity for receiving the hollow shaft 26.

The first half 8 of the housing is then provided with a generally perpendicular lip 8c which joins the first and second generally cylindrical walls. As illustrated, this lip 8c provides a shelf on which the thrust race 80 rests.

Hence, the force exerted by the water inlets 2,4 on the control member 14 are directed straight through the support structure 24 onto the thrust race 80 and to the lip 8c of the housing. In this way, the support structure 24 and shaft 26 need not be constructed so as to resist the twisting forces which would otherwise be produced in them by the water inlets. Forces are transmitted directly through the peripheral wall 24b of the support structure.

It will be appreciated that the various mixing elements in the apparatus provide resistance to flow through the apparatus. As a result of this, some back pressure occurs where the inlets 2, 4 meet the control member 14. Furthermore, since the apertures 16, 18 are elongate with respect to the sealing cup seals 50, water is able to pass through one of those apertures 16, 18 from the respective inlet 2, 4 and then pass back out through the same aperture 16, 18 along side the inlets 2, 4. Where the apparatus is set towards full hot or full cold or where the supply pressure for the two inlets is very different, leakage of water in this way can have a significant effect on the mixed water temperature. In particular, water may leak around the outside of the support 24 to the outlet cavity 72 around the hollow shaft 26.

In order to overcome this effect, the apparatus is provided with a seal 170. The seal 170 is annular in shape and seals between the inner surface of the walls of the first half 8 of the housing and an outer surface of the shaft 26. In particular, the seal 170 is positioned upstream of the outlet opening 70 and the outlet 6. In this way, water passing between the support 24 and the housing does not reach the outlet cavity 72.

Preferably, and as illustrated, the seal 170 is a V-seal such that its sealing ability increases as the differential pressure increases. In fact, this differential pressure will not be very high, since it results only from the back pressure caused from the mixing elements.

As mentioned above, the housing is formed of a first half 8 and a second half 10. Clearly, it is necessary to assemble these two halves together in such a manner that they seal correctly.

It might be possible for the first half 8 and second half 10 to be screwed together by means of threads on the respective halves. However, it would then be very difficult to ensure correct rotational alignment between the first and second halves when they had been fully rotated and tightened into a sealing engagement.

It might also be possible to provide an O-ring around an outer periphery of one half to seal with an inner periphery of the other half. However, O-rings are provided in grooves or channels. In this respect, in order to mould a suitable O-ring channel in an outer periphery of one of the first and second halves, it is necessary to use a mould which separates along a line running through the O-ring channel. In practice, this inevitably results in a slight ridge in the moulded plastic, thereby potentially damaging the O-ring itself or at least affecting its sealing properties.

In order to overcome these problems, as illustrated in FIGS. 2(*a*) and (*b*) and 14, the first half 8 includes a step 90 into which an O-ring 92 is fitted. The first half also includes a lip 94. As illustrated in FIGS. 2(*a*) and (*b*), the second half 10 of the housing includes an outwardly extending flange 96 at the end of which there is an axially extending flange 98. As also illustrated in FIGS. 2(*a*) and (*b*), the outwardly extending flange 96 and axially extending portion 98 of the second half 10 mate with the lip 94 of the first half 8. This mating is arranged such that the O-ring 92 is squeezed by the correct amount to achieve the required sealing. In particular, with the first and second halves 8,10 held in this position, correct sealing is achieved.

By this arrangement, it will also be noted that the join between the moulds for producing the first half 8 may run around a radial periphery of the first half 8, for instance around the edge of lip 94. In this way, the seating of the O-ring 92 need not be disturbed.

In order to hold the first and second halves 8,10 in this position, a collar 100 is provided.

The collar 100 fits around the lip 94 of the first half 8 and the portions 96, 98 of the second half 10 so as to prevent them from separating. By using a collar of a rigid material, there is no need to provide any squeezing force between the first and second halves 8, 10. The collar merely holds the first and second halves 8, 10 together in the correct position so that the O-ring 92 provides the correct sealing force. The force holding the collar 100 in place is radially inwardly of the lip 94 and portions 96, 98. Hence, the force is perpendicular to that needed to hold the first and second halves 8, 10 together. Hence, no great force is required to hold the collar 100 in place, but, with the collar in place, it can withstand considerable forces resulting from internal pressure trying to separate the first and second halves 8, 10.

As illustrated, it is also possible for the cross-section of the collar 100 to have inner support surfaces 102,104 which diverge slightly. The lip 94 of the first half 8 and the outwardly extending flange 96 of the second half 10 are angled by a corresponding amount. In this way, when the internal water pressure tries to separate the first and second halves 8,10 some of the axial separating force is transferred by means of the diverging surfaces to an outward radial force. In this way, the strength of the cross-section of the collar 100 need not be the limiting factor in holding the first and second halves together. By increasing the strength of the collar 100 around its periphery, increased internal pressures may be resisted. This may be achieved, for instance, by tightening a metal band around the outer periphery of the collar 100.

Hence, use of the collar 100 holding first and second halves 8, 10 together provides a simple and highly effective sealing arrangement. No undue pressure is exerted on the O-ring 92 and no components are required to be threaded together. In this respect, it will be noted that rotating the first and second halves 8, 10 relative to one another to engage a thread might twist and damage the O-ring 92.

As mentioned above and illustrated in FIG. 2(*b*) the shaft 26 extends through an aperture 27 in the first half 8 at the bottom of the outlet cavity 72 such that it may be rotated, for instance by the motor 28.

Figure 15A:
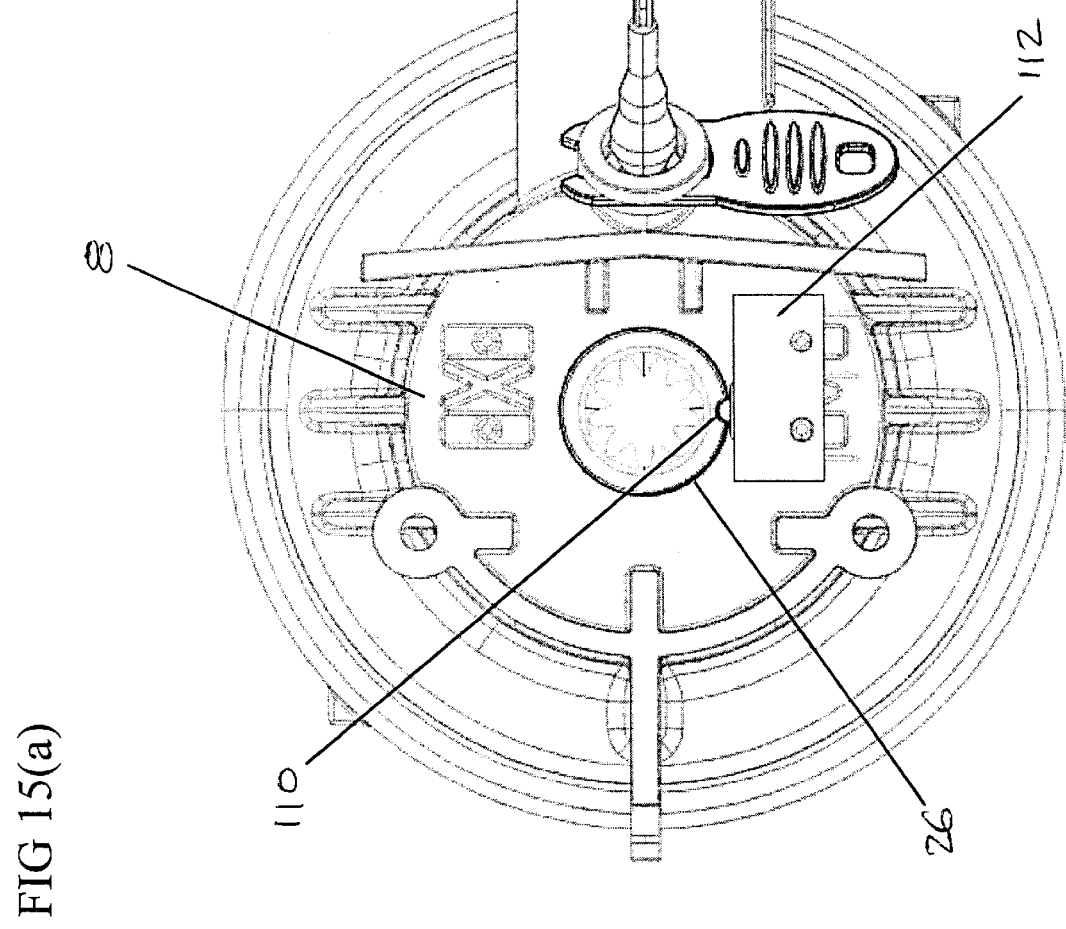
FIGS. 15(a) and (b) illustrate the upper housing of the valve of FIG. I with the servo assembly removed.
Figure 15B:
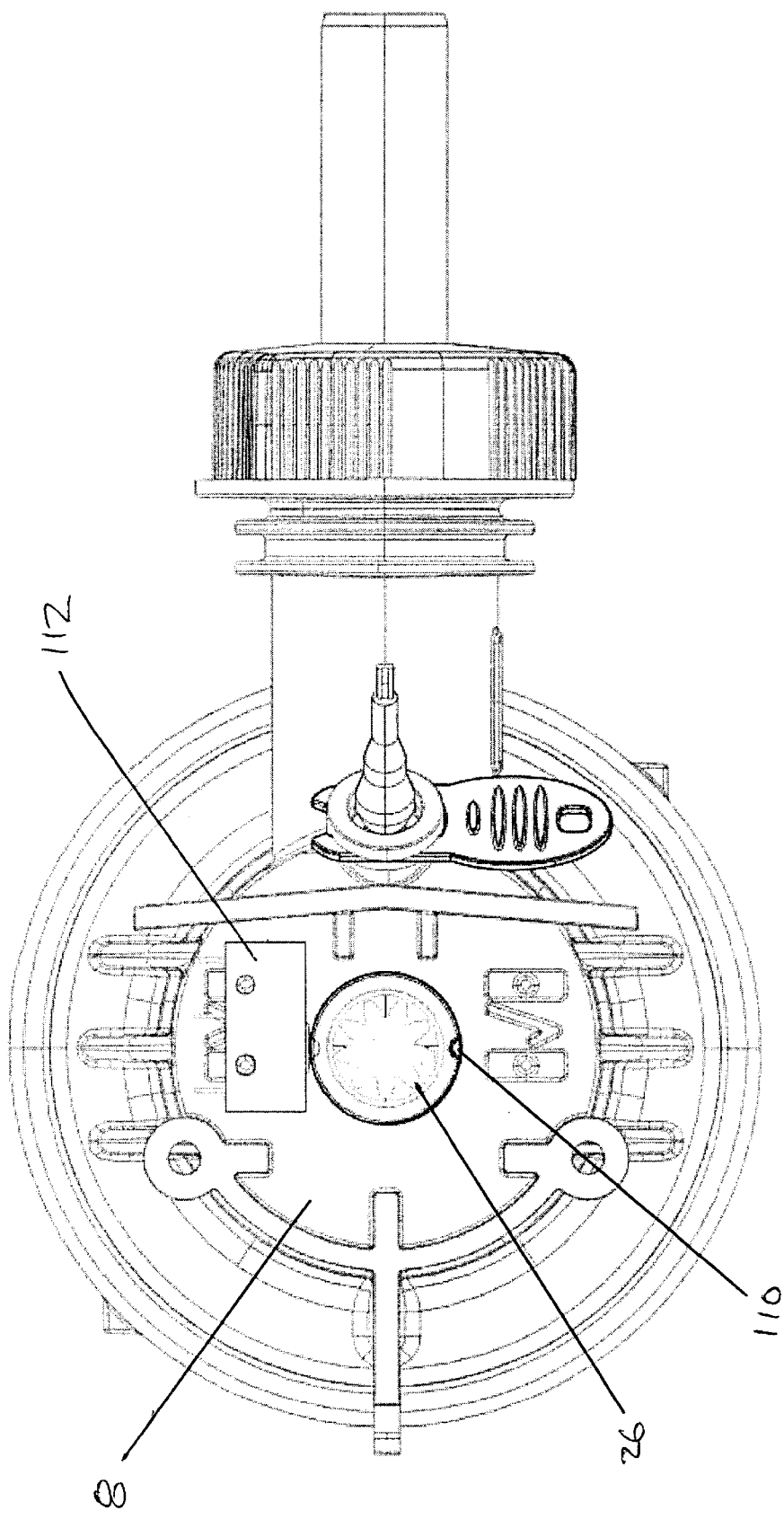

FIGS. 15(*a*) and (*b*) illustrate the apparatus with the motor 28 removed.

The shaft 26 includes a zero position indicator 110. The position of the zero indicator 110 around the periphery indicates the rotational orientation of the control member 14 within the valve housing. In particular, a zero detector 112 is provided on the outer surface of the housing such that whenever the zero position indicator 110 actuates the zero position detector 112, an associated control system can determine the position of the control member. Hence, the zero position detector 112 is actuated at a particular single rotational position. Preferably, actuation of the zero position detector 112 indicates the fully shut off position of the valve.

In this way, the motor 28 can merely rotate the control member 14 continuously until the zero position detector 112 is actuated such that the system then knows that this is the shut off position.

The zero position indicator 110 and zero position detector 112 may be embodied in a number of different ways. In particular, a cam may be provided on or connected to the shaft 26 in conjunction with a micro switch on the housing. As illustrated, the zero position indicator 110 comprises an indent in the outer periphery of the shaft 26 which is sensed by the detector 112. Alternatively, the zero position detector may be a photo detector responding to some marking or protrusion connected to the shaft 26.

Preferably, the zero position indicator 110 extends axially along the shaft 26 so that the detector 112 does not need to be located accurately in an axial direction. In particular, the detector may be mounted to the outer surface of the housing on pins at a predetermined angular position.

When connecting the inlets 2, 4, it is often essential to ensure that the inlets 2, 4 are connected to the correct water supplies. In particular, when mixing valves are used to mix hot and cold water, it is usually essential that a particular inlet be connected to the hot water supply. Indeed, referring to FIGS. 3(*a*) and (*b*), it will be noted from the above description that, rotating the control member 14 clockwise to provide the opening 16 adjacent a water inlet, the system will always expect to be turning on either the cold or the hot water supply. For domestic use with showers for example, it is essential that, upon opening the valve, the valve always opens the cold water supply first and then mixes in hot water.

The valve will not operate correctly with the inlets reversed as the valve may give full hot instead of simply shutting down.

By using the zero position indicator 110 and zero position detector 112, this can be overcome.

In particular, if the water inlets are incorrectly connected, such that the valve fails to operate, it is not necessarily to change the water connection. Instead, one or other of the zero position indicator and zero position detector can be moved to an opposite position relative to the shaft 26 and control member 14. In this respect, FIGS. 15(*a*) and (*b*) illustrate the repositioning of the zero position detector 112. In this way, for the illustrated embodiment, the opposite position will be an opposite diametric position relative to the shaft 16 and control member 14 and the control system will view the shut off position as being 180 degrees from the current position and will reset the control member 14 to that new position. Of course, with other arrangements, the shut off position may be some other angle from the current position. From the new position, rotation of the control member 14 will first open the cold water supply as expected.

Rather than move the zero position detector on the housing, it is also possible to provide two diametrically opposed zero position detectors. In this case, the appropriate detector can be connected manually by the user according to observed operation of the valve. Alternatively, the control system could automatically enable the zero position detector which provides correct functioning of the valve.

It will be appreciated that the principle of using a zero position indicator and detector or detectors and moving/switching them can be applied to other arrangements of control member, such that the movement will not always be diametric. For instance, for linear arrangements such as illustrated in FIGS. 8(*a*) and (*b*) the indicator or detector would be moved from one end of travel to the other. However, the principle is particularly advantageous with the illustrated embodiment where the control member 14 is able to continuously rotate in one direction through all modes of operation.

As mentioned above, the valve may include a temperature sensor 30 for sensing the temperature of the water mixed from the inlet valves 2 and 4.

When the valve is shut off, it is possible for water to drain out of the mixing chamber 12 and outlet 6. Hence, components within the valve may dry, leaving scale behind. This can be particularly damaging to temperature sensors such as thermistors.

For the preferred embodiment as illustrated in FIGS. 2(*a*) and (*b*), the temperature sensor 30 is provided in the outlet cavity 72 immediately adjacent the outlet 6. In particular, flow from the plurality of openings 70 in the hollow shaft 26 to the outlet 6 will move directly past the temperature sensor 30 such that the temperature sensor 30 responds directly to the mixed water flow currently leaving the outlet 6.

Figure 16A:
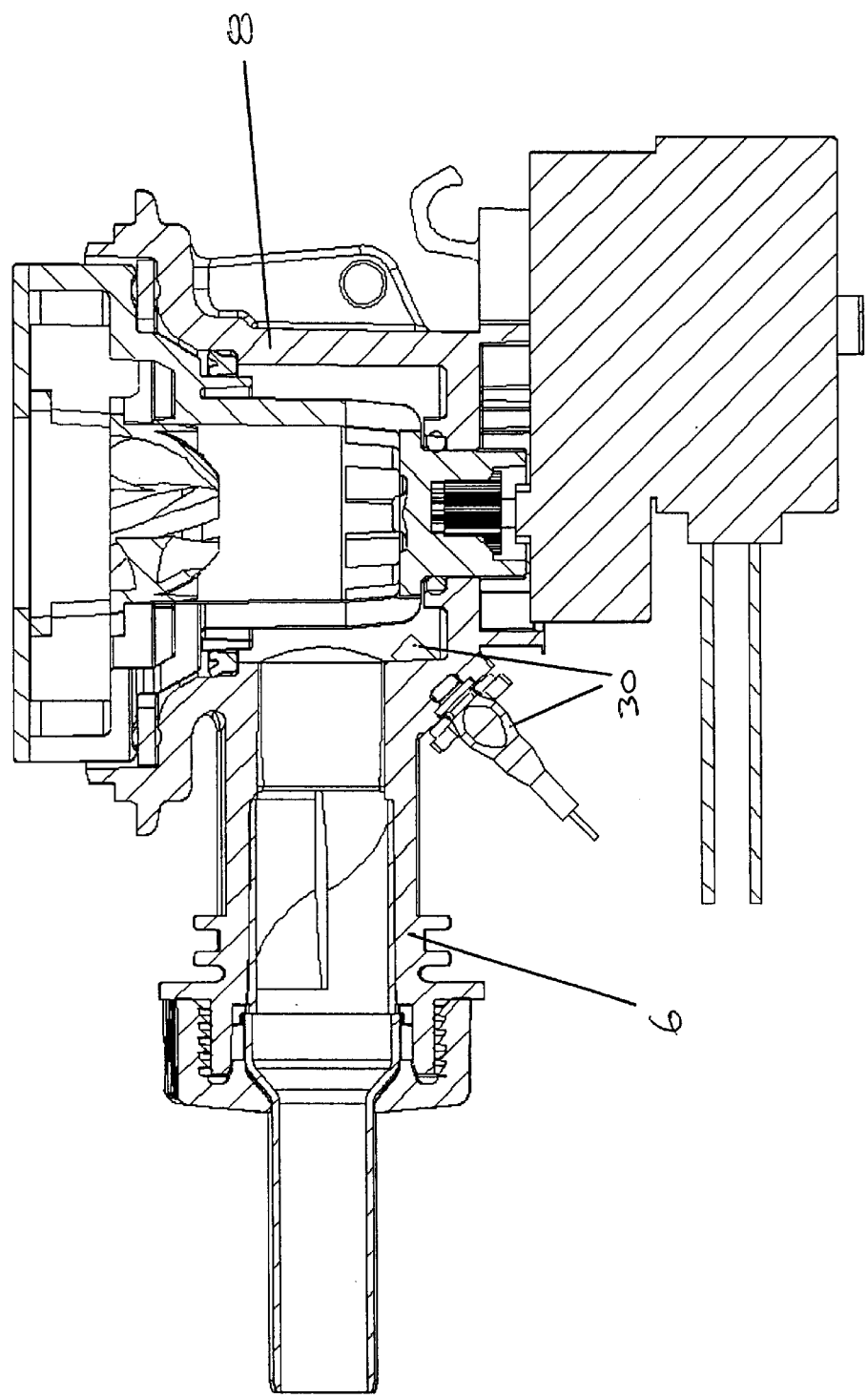
FIGS. 16(a) to (c) illustrate cross-sections through the valve of FIG. 1 showing the temperature sensor.
Figure 16B:
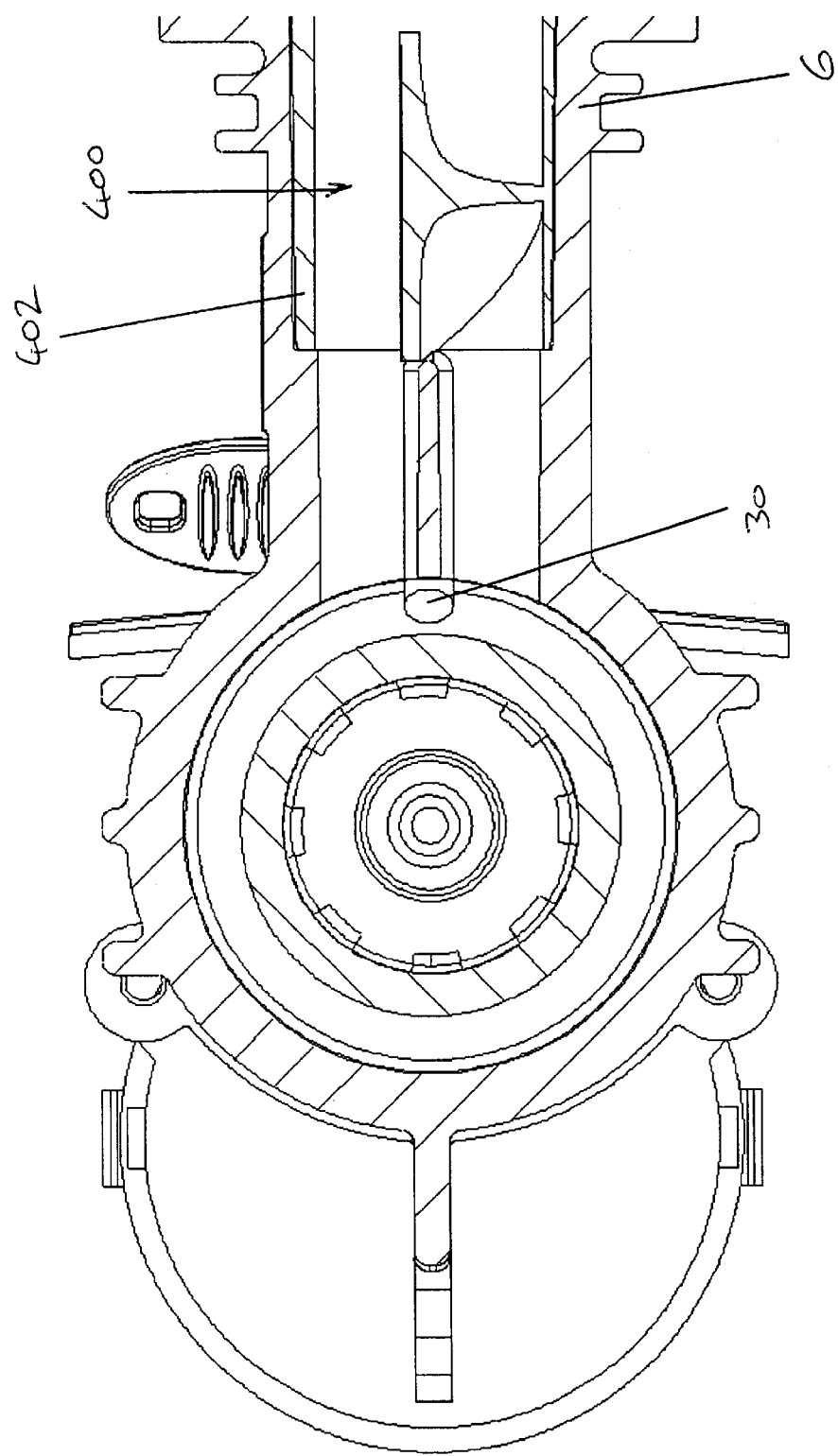
Figure 16C:
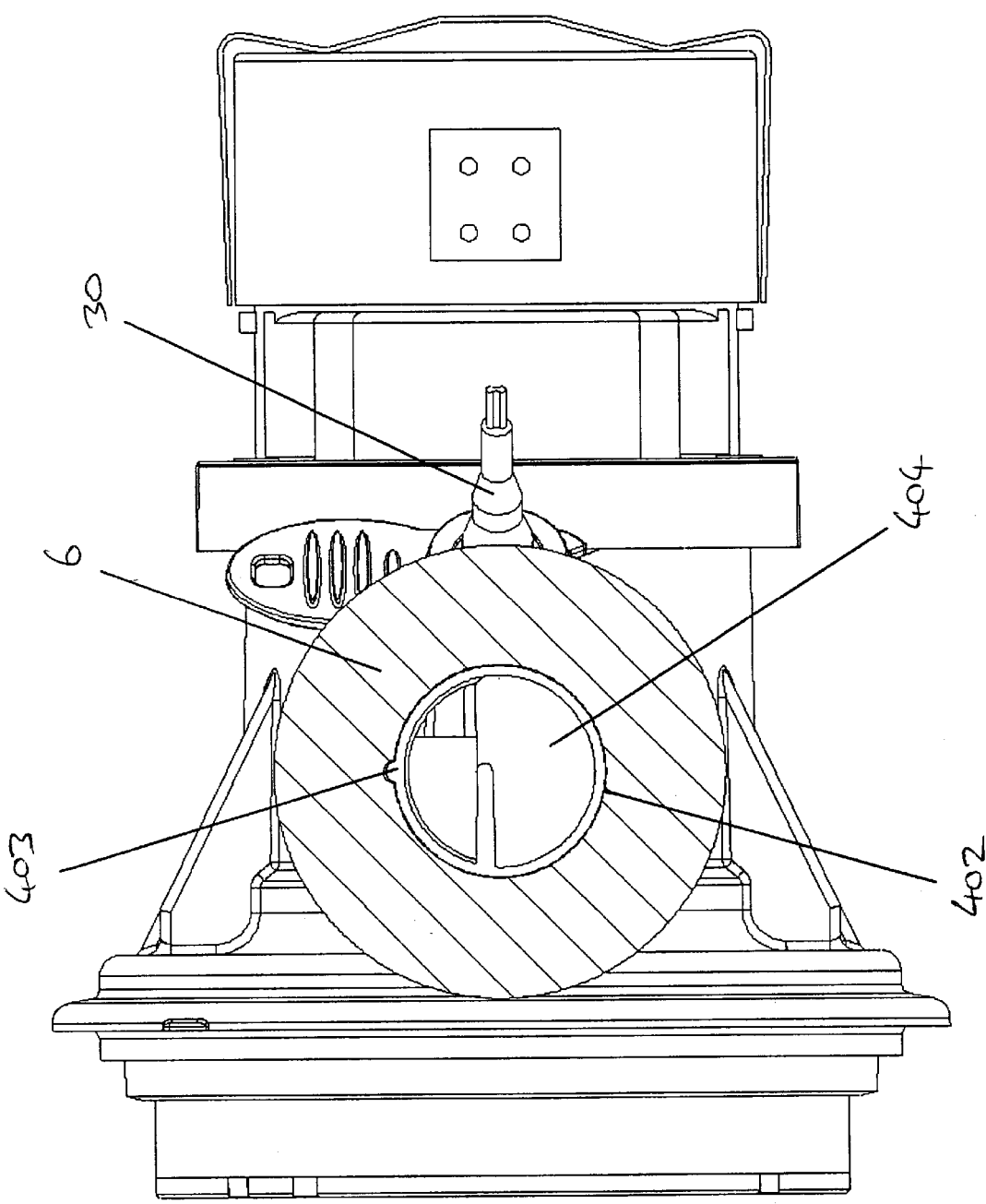

With this location for the temperature sensor 30, referring to FIG. 16(*a*), it will be seen that in any orientation of the apparatus with the axis of rotation of the control member 14 being vertical, when water is drained out of the cavity 72 through the outlet opening to the outlet 6, a small amount of water will be left at the bottom of the cavity 72 beneath the lip of the outlet opening. Since, in these orientations, the temperature sensor 30 is positioned below the outlet opening, this results in the temperature sensor 30 remaining submerged in water.

Similarly, of course, if the apparatus is orientated with the outlet uppermost, the outlet cavity 72 will remain full of water and the temperature sensor 30 submerged.

On the other hand, if the apparatus is orientated with the rotational axis of the control member 14 horizontal and the outlet horizontal, when water is drained from the outlet 6, since the temperature sensor 30 is located centrally with respect to the outlet, it is above the lower lip of the outlet and hence above water held in the outlet cavity 72.

It will be appreciated that when the system is allowed to drain under gravity, water will only move downwards and not upwards. Therefore, the temperature sensor 30 should be positioned below the lowest point from which water will drain from the outlet cavity 72.

In practice, the apparatus will be provided with means by which to mount it to a wall, ceiling, floor etc. Depending on the particular installation constraints, it is useful to be able to mount the apparatus in various different orientations. On the basis that it will be mounted to a horizontal or vertical surface, there are six basic possible orientations, namely the three mutually perpendicular axes and the two opposite directions for each axis.

In practice, there may be constraints as to how the apparatus is mounted in view of the space available. Hence, it is proposed that the apparatus should be mountable in three mutually perpendicular orientations and that in all of these orientations the temperature sensor 30 still remains submerged in water when the water is allowed to drain from the apparatus by gravity. In other words, when the valve is turned off between uses.

As mentioned above, clearly with the outlet opening of the outlet 6 uppermost, the temperature 30 will remain submerged. Also, with the temperature sensor 30 located just outside the diameter of the outlet opening, the outlet 6 can be oriented horizontal with the temperature sensor 30 still below the lower lip of the outlet opening and hence still remaining submerged in the outlet cavity 72.

Of course, in some devices, the outlet orifice may be slanted with respect to the housing such that when the housing is mounted, the orifice is slanted with respect to the horizontal and vertical. In this respect, where the horizontal and vertical planes intersect the periphery of the outlet orifice, to achieve the same effect, the temperature sensor 30 must be positioned below those planes so as, once again, to remain submerged.

As illustrated in FIGS. 16(*b*) and (*c*), although the temperature sensor 30 is mounted outside the diameter of the outlet orifice, it is mounted centrally with respect to the orifice, ie along an extension of the outlet opening. Thus, with the apparatus on its side, ie with the outlet opening in a vertical plane, water will drain from the cavity 72 so as to leave the temperature sensor 30 exposed.

Figure 17A:
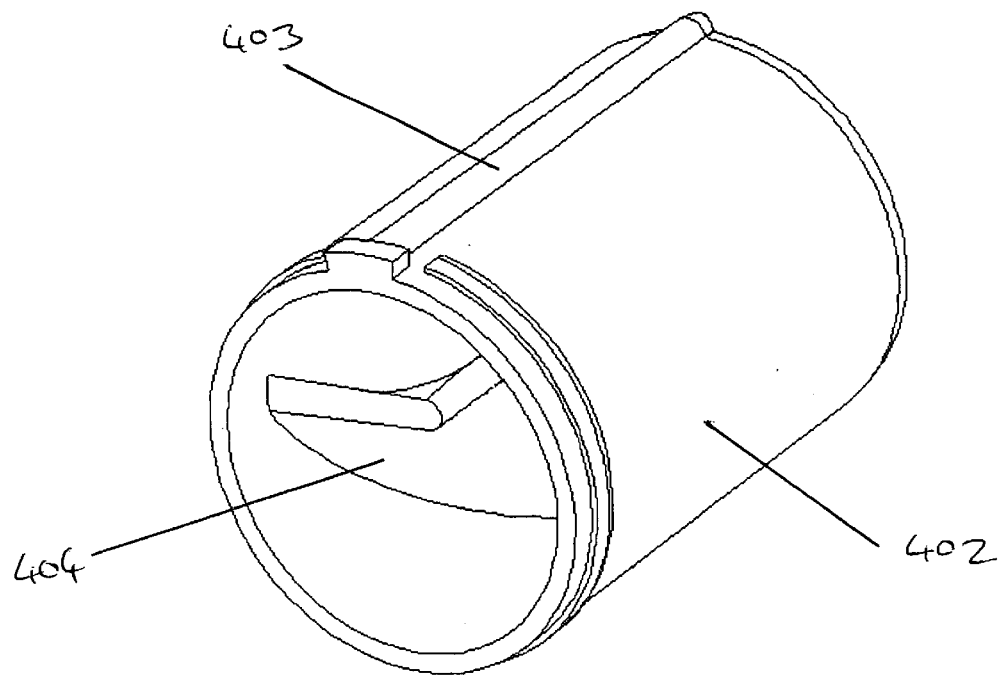
FIGS. 17(a) to (c) illustrate the baffle of FIGS. 16(a) to (c)
Figure 17B:
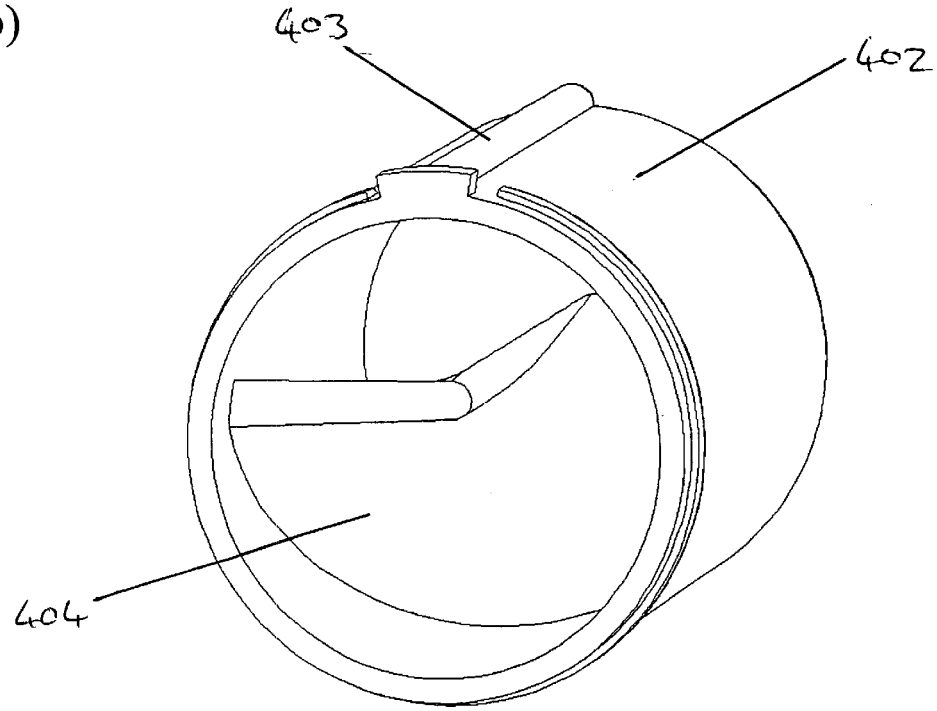
Figure 17C:
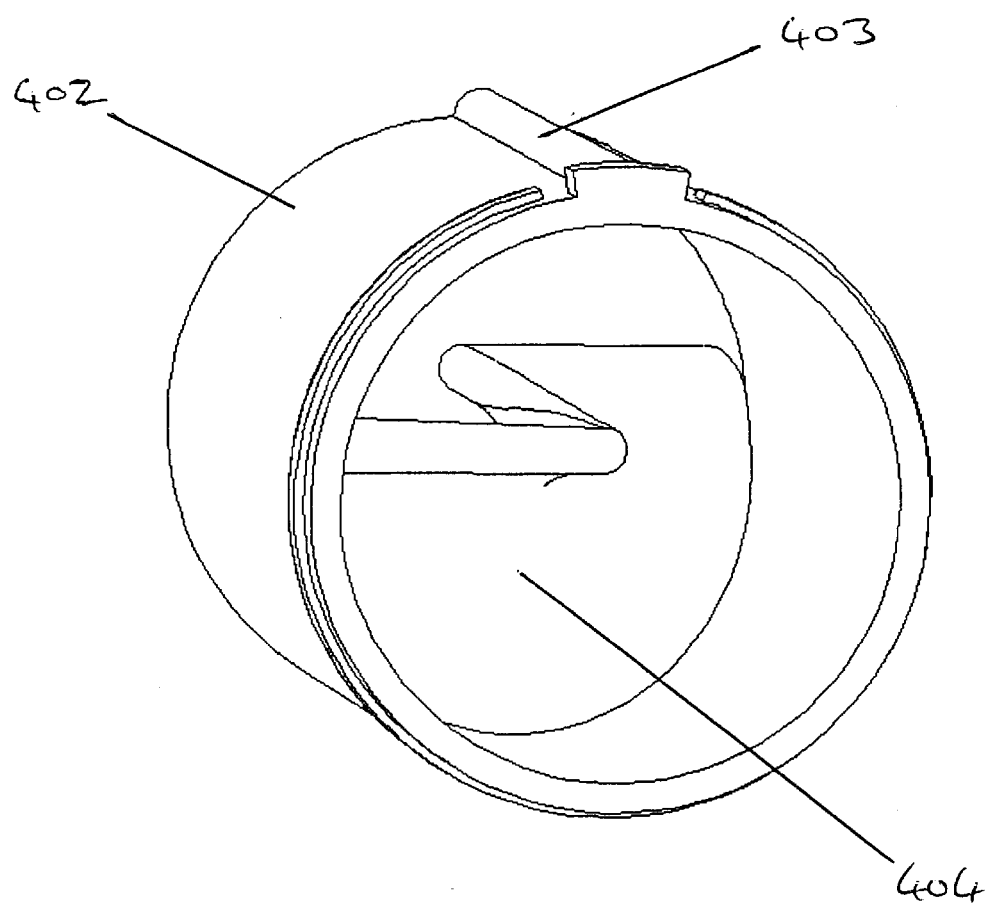

To overcome this, an insert 400 is provided for insertion into the outlet 6. This is illustrated in FIGS. 17(*a*) to (*c*).

As illustrated, the insert 400 comprises an outer cylindrical wall 402 to be received in the outlet 6. The insert 400 seals with the outlet 6 and, in this regard, may be constructed of a resilient material for push fitting into the outlet 6. It may also include means, such as the ridge 403, to interact with the outlet 6 and ensure a correct relative orientation.

The insert 400 further includes a baffle 404 within the cylindrical wall 402. The baffle 404 comprises a helical or spiral section similar to an Archimedean screw. The centre of that helical section is offset with respect to the centre of the cylinder 402 and, hence, the outlet 6. The offset is designed to be sufficient to encompass the width of the temperature sensor 30 which is positioned centrally with respect to the outlet 6. Hence, if the temperature sensor 30 were offset, then the helical baffle 404 would not need to go beyond the half way line.

Thus, referring to FIG. 16(*c*), it will be seen that the baffle 404 provides a lip in the outlet 6 which is higher than the temperature sensor 30. Thus, when water is allowed to drain from the apparatus, it is retained in the outlet cavity 72 up to the level of the baffle 404 and the temperature sensor 30 remains submerged.

By providing the spiral section, the outlet 6 remains relatively unrestricted. In particular, the internal cross-sectional area of the outlet 6 is only reduced by the thickness of the spiral section, rather than the overall cross-sectional area of the baffle. In other words, during normal flow, the water is merely caused to rotate.

Of course, similar arrangements can be provided for other devices in which, as mentioned above the outlet orifice and/or the outlet are not arranged parallel to the horizontal or vertical when the device is mounted. In this case, the lowest point of the baffle can be considered to form an effective boundary, ie the level at which the baffle is effective in restricting flow of water during draining. Where the horizontal plane passes through this effective boundary, the temperature sensor should be positioned below the plane. In this way, the baffle will ensure that the temperature sensor 30 remains submerged.

Figure 18A:
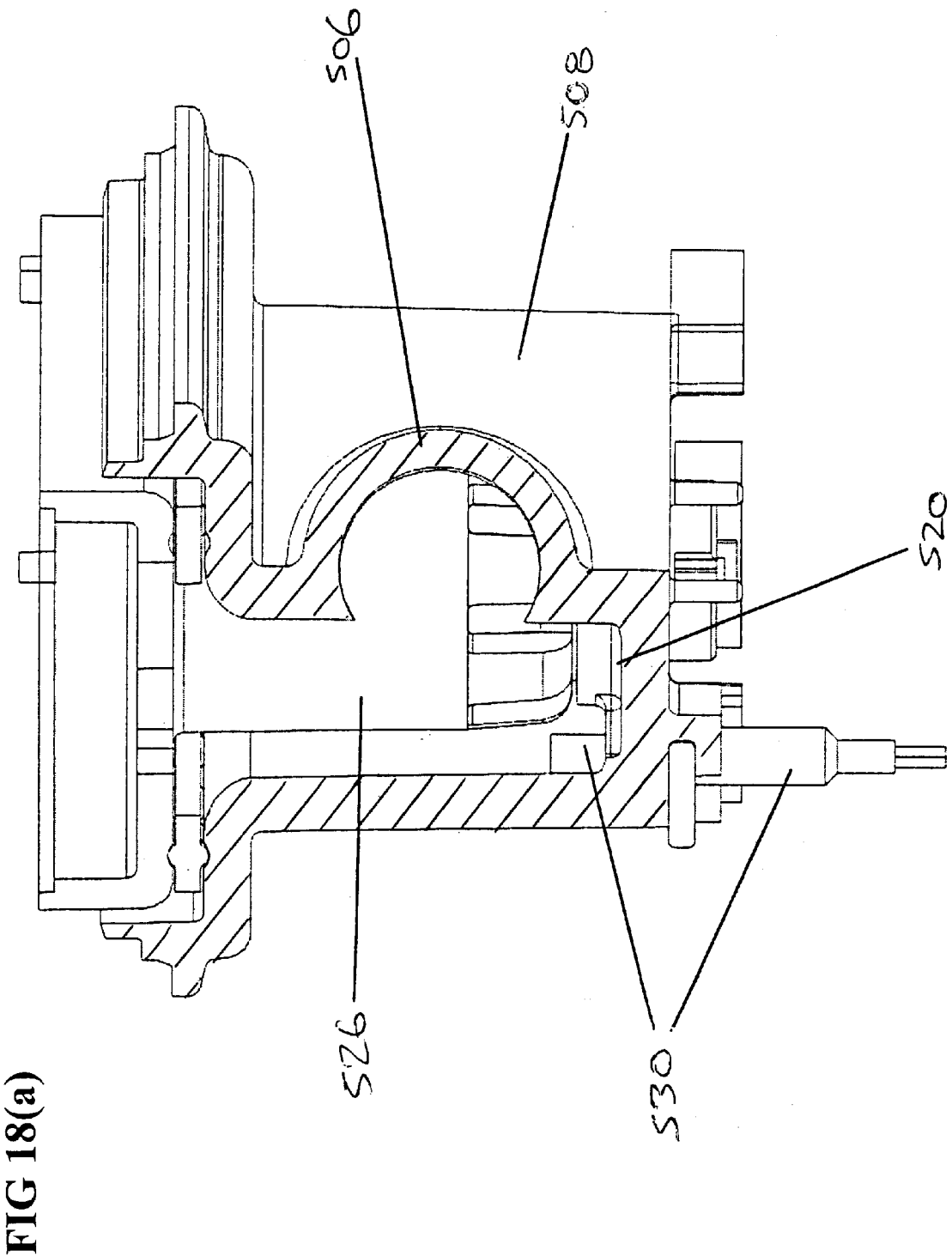
FIGS. 18(a) and (b) illustrate cross sections of an alternative housing for maintaining the temperature sensor submerged.

FIGS. 18(a) and (b) illustrate an alternative arrangement. The housing of the valve is arranged such that the active part of temperature sensor 530 extends into a portion of the valve housing which will retain water after water is drained out of the valve housing through the outlet 506.

Referring to FIG. 18(a), it will be seen that the tip of the temperature sensor 530 lies below the outlet 506. This is clearly true for all orientations represented by FIG. 18(a) with the outlet 506 horizontal and above the temperature sensor 530.

Figure 18B:
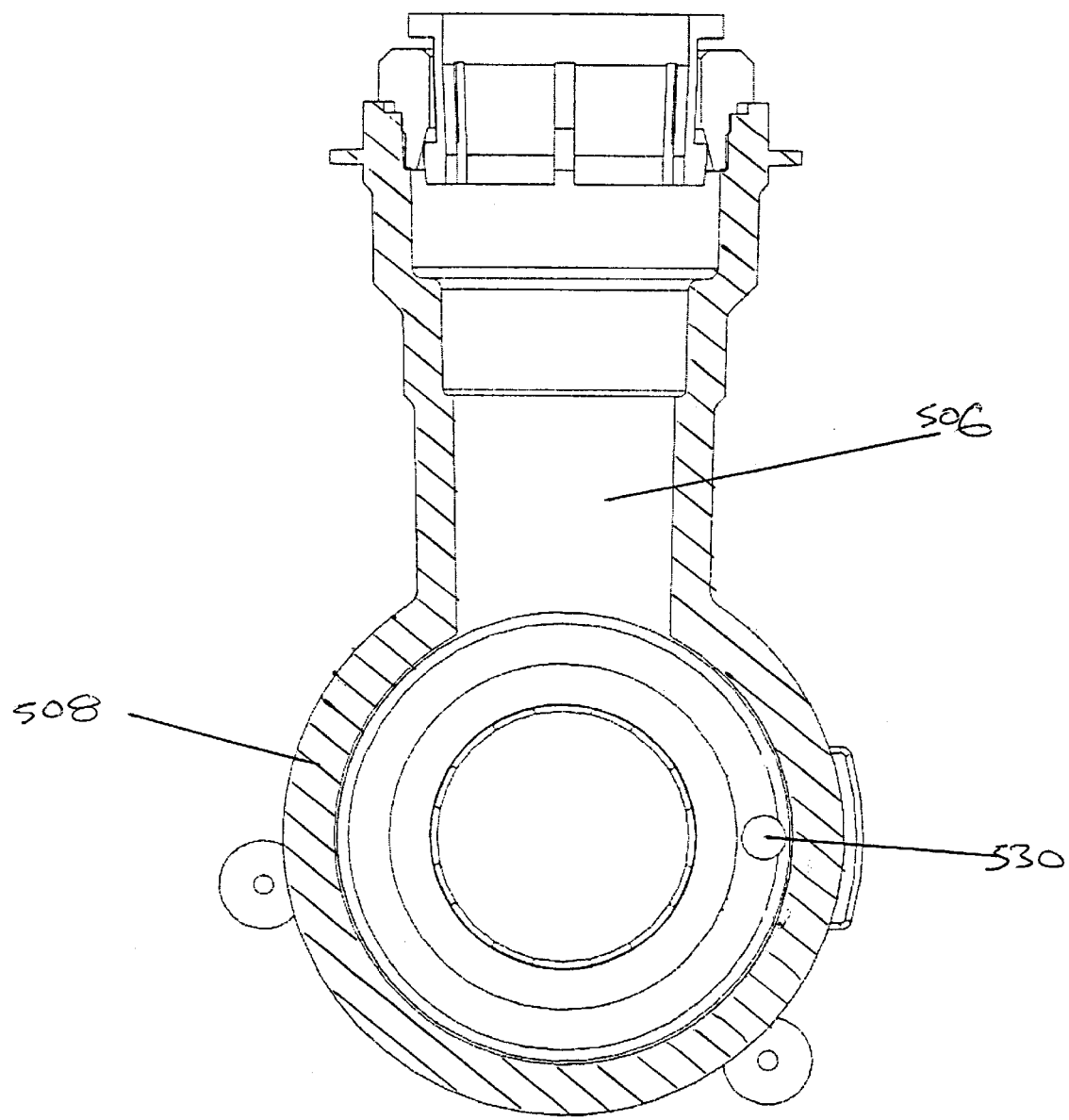

Referring to FIG. 18(b), it will be seen again that with the outlet 506 orientated vertically above the valve, the temperature sensor 530 or at least its tip, will remain submerged in water when water is drained from the valve housing through the outlet 506.

The housing of the valve is arranged such that the temperature sensor 530 or at least its tip extends into a recessed portion 520. This recessed portion 520 is arranged such that in three perpendicular orientations and the orientations between them, when water is drained from the valve housing, a small pocket of water will remain in the recess 520 keeping the temperature sensor 530 submerged.

Thus, in this way, by keeping the temperature sensor or at least its tip submerged, scale will be less prone to building up on the temperature sensor 30 and its life will be greatly increased.

In general, as mentioned above, the valve will be provided in some form of generally rectangular casing for installation in a building. Hence, the valve 30 is arranged in the valve housing such that with the valve mounted within the casing, of the six possible orientations of the casing, in three mutually perpendicular orientations, the temperature sensor 30 will remain immersed in water.

It will be appreciated with the particular illustrated embodiment, the temperature sensor will also remain submerged for orientations between those three perpendicular orientations.

We claim:

1. A water mixing valve having:
   two water inlets;
   a mixing chamber;
   a rotatable control member having openings for controlling flow from the water inlets to the mixing chamber, the control member comprising a substantially circular plate having first and second surfaces, the water inlets sealing against the first surface and the openings extending between the first and second surfaces; and
   a support for supporting the control member on the second surface, the support including surfaces adjacent the openings in the control member for directing flows from the respective openings towards one another and into the mixing chamber for efficient mixing.

2. A water mixing valve according to claim 1 wherein the support is attached to the outer periphery of the control member so as to form the mixing chamber adjacent the second surface.

3. A water mixing valve according to claim 1 wherein the support includes a base wall generally parallel to the control member and a peripheral wall joining the periphery of the base wall to the periphery of the control member.

4. A water mixing valve according to claim 3 wherein the support includes an annular wall extending from the base wall to the second surface of the control member so as to define an outer peripheral channel between the annular wall and the peripheral wall and a central mixing cavity within the annular wall wherein:
   the openings are positioned in the control member outwardly of the annular wall; and
   windows are provided in the annular wall to allow flow of water from the outer peripheral channel to the central mixing cavity.

5. A water mixing valve according to claim 4 wherein the support includes a pair of generally radially extending and diametrically opposed walls dividing the outer peripheral channel into a pair of channels, each channel being opposite a respective one of said openings.

6. A water mixing valve according to claim 5 wherein said opposed walls are positioned generally symmetrically with respect to the openings.

7. A water mixing valve according to claim 6 wherein four of said windows are provided in said annular wall, one at each end of each of said channels.

8. A water mixing valve according to claim 4 further including a hollow shaft by which the support may be rotated, the shaft extending axially from the base wall and the base wall defining a central aperture within the annular wall such that water may flow from the central mixing cavity into the shaft.

9. A water mixing valve according to claim 8 wherein, proximate the central mixing cavity, the interior of the shaft is provided with inwardly facing vanes so as to cause a spiral flow of water within the shaft.

10. A water mixing valve according to claim 9 wherein the vanes extend axially along the shaft and, over the extent of the vanes, the internal cross section of the shaft is progressively reduced in the direction of flow and, at the end of the vanes, enlarged so as to form a throttle or venturi.

11. A water mixing valve according to claim 9 wherein, at the upstream end of the vanes, adjacent the central mixing cavity, each vane is offset from a respective window around the central aperture by an amount such that a vortex of flow from the respective window is centred on the respective vane.

12. A water mixing valve having:
   two water inlets;
   a mixing chamber;
   a rotatable control member having openings for controlling flow from the water inlet to the mixing chamber, the control member comprising a substantially circular plate having first and second surfaces, the water inlets sealing against the first surface and the openings extending between the first and second surfaces;
   a support including a base wall generally parallel to the control member and a peripheral wall extending from the periphery of the base wall to the periphery of the control member so as to support the control member and form the mixing chamber therebetween; wherein the support and control member are together rotatable relative to the water inlets;

the base wall includes inner and outer surfaces, the inner surface facing the second surface of the control member; and the water mixing valve further includes:

a thrust race supporting the support at an outer periphery of the outer surface of the base wall.

13. A water mixing valve according to claim 12 wherein the thrust race includes a plurality of rotatable members distributed for contact around the outer periphery of the outer surface of the base wall.

14. A water mixing valve according to claim 13 wherein the thrust race comprises a moulded member holding the plurality of rotatable members captive.

15. A water mixing valve according to claim 12 further including a hollow shaft by which the support may be rotated, the shaft extending axially from the base wall and the base wall defining a central aperture such that water may flow from the mixing chamber into the shaft.

16. A water mixing valve according to claim 15 further including a housing for containing the control member, support and hollow shaft, the housing including:

first walls defining an inlet cavity for receiving the peripheral wall of the support;

second walls defining an outlet cavity for receiving the hollow shaft; and a lip between the inlet and outlet cavities; wherein the thrust race is located between the base wall and the lip such that the support is rotatably supported on the lip.

17. A water mixing valve according to claim 16 wherein the second walls define a drive aperture and the hollow shaft extends in the outlet cavity from the lip to and through the drive aperture so as to enable the hollow shaft, support and control member to be rotated.

18. A water mixing valve according to claim 16 wherein the second walls define a water outlet and the hollow shaft is provided with a plurality of outlet openings around a periphery opposite said water outlet such that water may flow from within the hollow shaft through the outlet openings into the outlet cavity and then out through the water outlet.

19. A water mixing valve according to claim 18 further including a seal between the hollow shaft and the second walls upstream of said water outlet and said outlet openings so as to prevent water passing directly from the two water inlets between the support and the housing to the water outlet.

* * * * *